United States Patent [19]

Meyer

[11] Patent Number: 5,396,342

[45] Date of Patent: Mar. 7, 1995

[54] AUTOMATIC REMOTE FACSIMILE TESTING SYSTEM

[76] Inventor: Richard R. Meyer, 258 Edelen Ave., Los Gatos, Calif. 95030

[21] Appl. No.: 839,098

[22] Filed: Feb. 20, 1992

[51] Int. Cl.⁶ .............................................. H04N 1/00
[52] U.S. Cl. .................... 358/406; 358/442; 379/100
[58] Field of Search ............... 358/442, 406, 472, 405; 379/96, 100, 93, 127, 100

[56] References Cited

U.S. PATENT DOCUMENTS

| 4,910,765 | 3/1990 | Matsuse | 379/100 |
|---|---|---|---|
| 4,918,722 | 4/1990 | Duehren et al. | 379/100 |
| 4,922,348 | 5/1990 | Gillon et al. | 358/407 |
| 4,922,524 | 5/1990 | Baba et al. | 379/100 |
| 4,924,494 | 5/1990 | Shung | 379/100 |
| 4,941,170 | 7/1990 | Herbst | 379/100 |
| 4,956,721 | 9/1990 | Tasaki | 358/402 |
| 4,964,154 | 10/1990 | Shimotono | 379/100 |
| 4,965,676 | 10/1990 | Ejiri et al. | 358/406 |
| 4,967,288 | 10/1990 | Mizutori et al. | 358/425 |
| 4,974,254 | 11/1990 | Perine et al. | 379/100 |
| 4,994,926 | 2/1991 | Gordon et al. | 358/400 |

Primary Examiner—Edward L. Coles, Sr.
Assistant Examiner—Thomas L. Stoll

[57] ABSTRACT

Users of facsimile communications systems may test their fax transceivers by transmitting a test fax page over the public switched telephone network to a system that makes measurements of the test transmission and of telephone line characteristics. Measurements are analyzed to locate possible anomalies. Results of analysis, the measurements themselves and a copy of the user's test fax are incorporated into a test report. The test report is delivered to users as a fax message or spoken announcement during the same call or a second call.

17 Claims, 5 Drawing Sheets

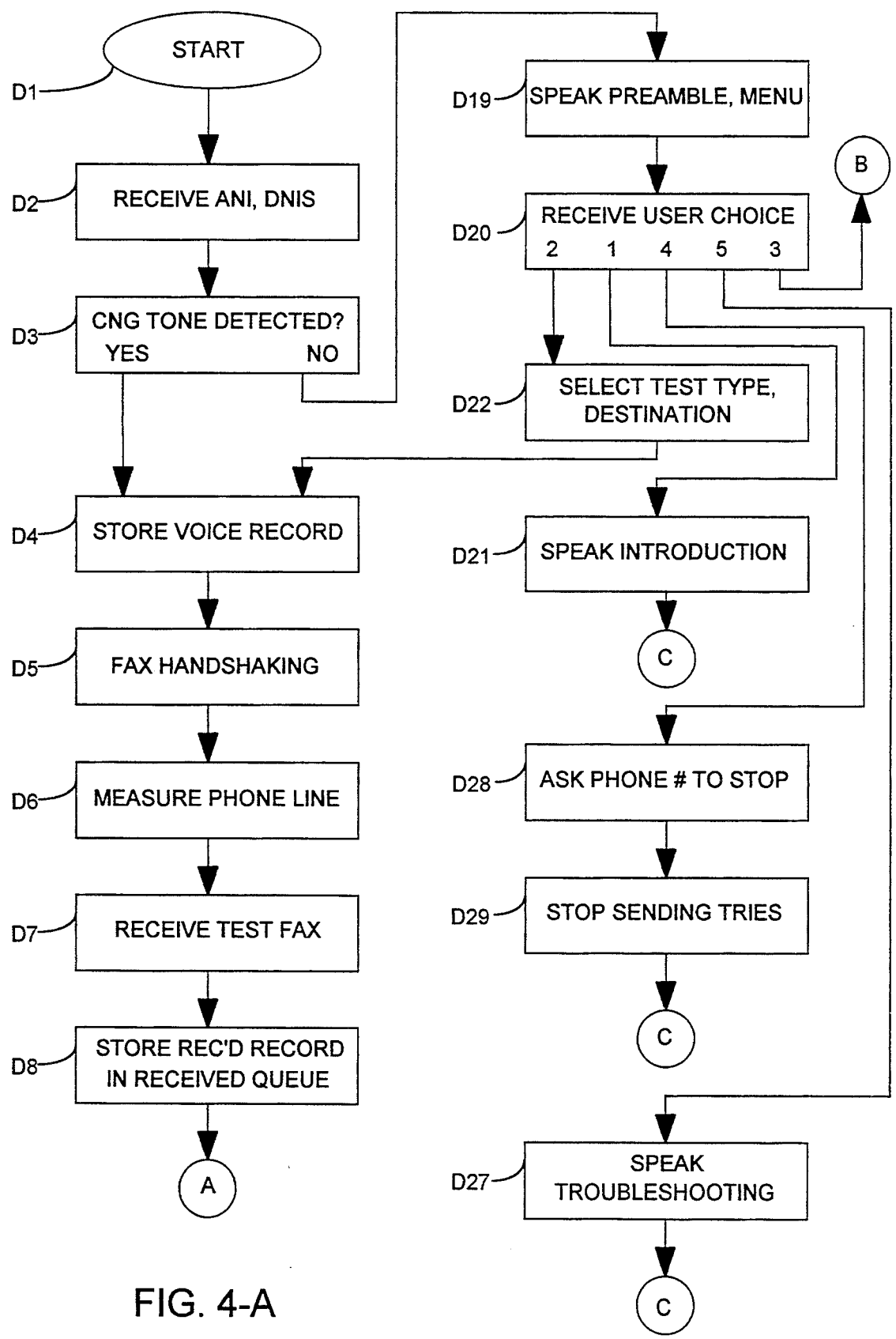
FIG. 4-A

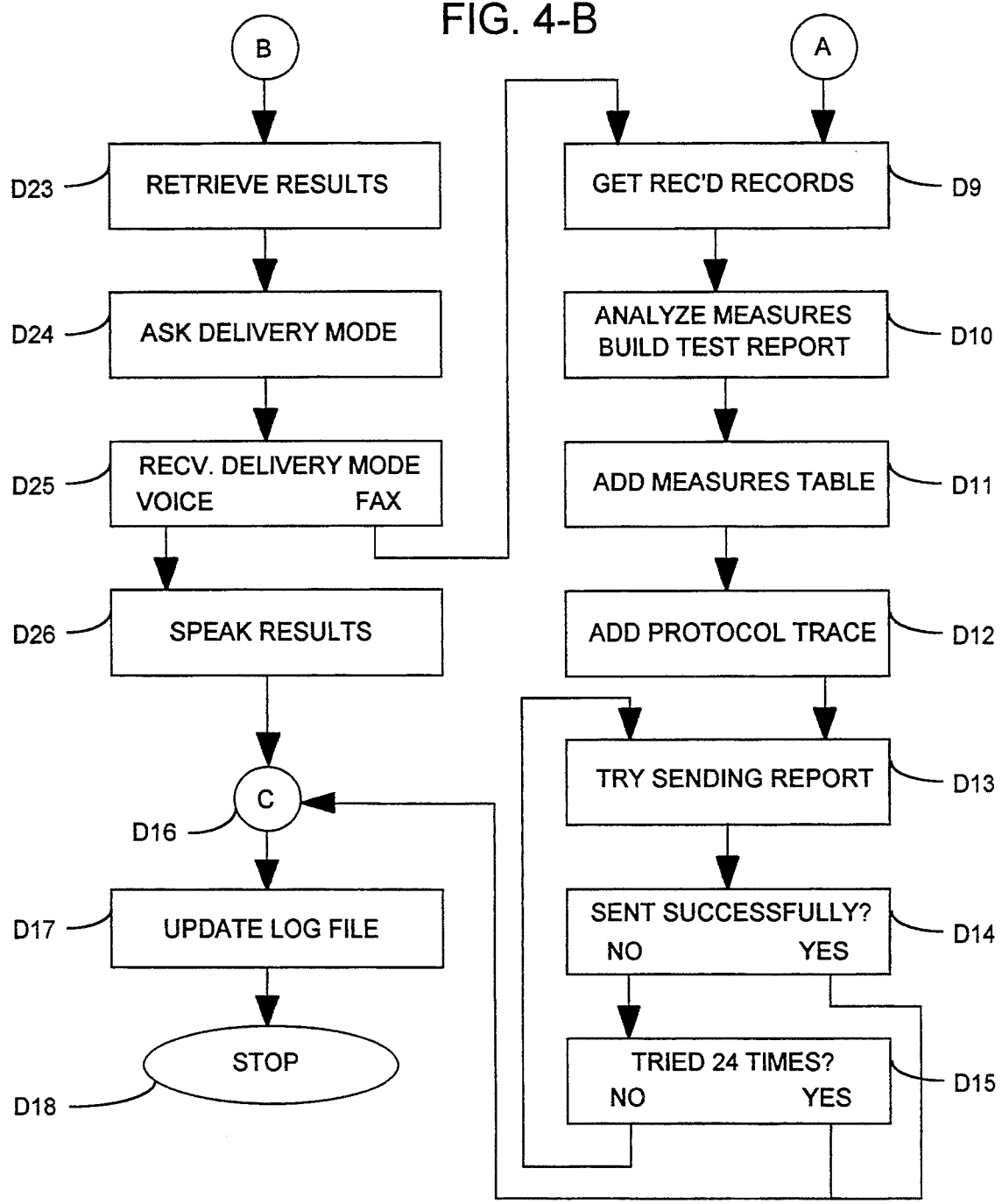
FIG. 4-B

AUTOMATIC REMOTE FACSIMILE TESTING SYSTEM

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to the testing of facsimile transceivers and their telephone lines remotely by their users or by service technicians. It automatically accepts test fax transmissions from any fax transceiver, measures the transmissions and supplies measurements and advice to help users detect and correct problems. The invention can also be used for user training, preventive maintenance and confirmation of the success of initial transceiver installation and subsequent programming and repairs.

DESCRIPTION OF THE PRIOR ART

In 1991, there were approximately fifteen million fax transceivers in use worldwide. Most machines are used in businesses for important and often time-critical business correspondence, making continuous availability and reliability very important to users. The result of having a facsimile communications system out of service may be the loss of crucial business communications. Most fax transceivers in current use conform to standards developed by the Consultative Committee for International Telegraphy and Telephone (CCITT) known as the Group III standards that allow fax transceivers from any manufacturer to communicate with any other conforming machine. Fax transceivers communicate with one another over the worldwide public switched telephone network. Their transmissions are identical to ordinary voice telephone calls from the perspective of the telephone network. The term "facsimile communications system" is used herein to refer to the combination of a fax transceiver and the telephone equipment and local telephone lines that connect it to a long distance telephone network.

Troubleshooting of fax problems is complicated by the presence of many elements in the communications path and the inherent complexity of facsimile transceivers themselves. As a result, users usually leave problem diagnosis to specially trained technicians who work for fax manufacturers, retail outlets, fax service centers and telephone repair services. A successful fax transmission depends on private telephone equipment and public telephone networks, two fax transceivers, a suitable document for transmission and fax paper in the receiving machine. Users typically discover problems when they try unsuccessfully to transmit a fax message or when they hear from a remote user that their transceiver has transmitted an incomplete or illegible message or is unavailable to receive a message the remote user has tried to send.

When users experience a problem with fax transmissions, they usually lack the information and expertise to determine its cause. They often do not even know which equipment or service vendor is appropriate to contact for assistance. Most possible causes originate with products or services from several independent vendors each of which has unique arrangements for supporting and servicing their customers. As a result, users often call the most visible vendor, such as the vendor who sold them the fax transceiver. After incurring expense and delays, the vendor frequently informs the user that a product from a different vendor or user error is the source of the problem. When two vendors each assert that the other's product is the cause of a problem, users lack detailed knowledge to convince the appropriate vendor to assume responsibility. While this process may eventually result in a solution, it does so with unnecessary expense, delay and frustration because of the above previously unrecognized problems and limitations.

Test equipment designed for use by fax and telephone service technicians is available to locate fax transceiver and telephone carder problems. However, such equipment has the following disadvantages:

1. It requires a trained technician to operate and is unsuitable for laymen. The user must expend effort locating and contacting a technician and waiting for results, results that vary with the expertise of the technician.
2. It requires prior contact between the technician and the user to arrange for a test transmission.
3. The technician must monitor the test transmission and read and interpret the results for the user.
4. Results and advice are given to users verbally and are not available as written form.

Certain fax transceiver models have a feature known as "remote diagnostics." This feature permits a trained technician with special equipment at a remote location to connect with the transceiver by telephone, examine diagnostic and configuration information stored in the transceiver and make changes to certain settings. The remote diagnostics feature has the following disadvantages:

1. It uses proprietary communications protocols that are unique to each vendor or model and do not conform to any international standard. As a result different test equipment and technician training are needed for each vendor's fax transceivers and sometimes for each model.
2. It requires a trained technician to operate and is unsuitable for laymen.
3. It requires contact between the user and the technician to report the problem, evaluate the need for a remote diagnostics session and report the results of the session to the user, often requiring several telephone calls.
4. The technician must conduct the session manually and interpret the results of any information discovered for the user.
5. Test results and advice are commonly given verbally and are not available in written form.

Most fax transceivers have a local copy or self-test function that permits the user to make a copy of a document using the machine's scanner and printer. This function allows users to examine some aspects of their fax image quality. Local copies, however, are not representative of the quality of fax transmissions actually received on remote machines, however, because transmitted images may have been degraded by the local machine's fax modem or by telephone carriers, components that are not tested by the self-test function. This deficiency limits the function's diagnostic uses.

The above disadvantages and problems with existing fax test equipment, remote diagnostic features and self-test functions have existed for ten years or more and have not been previously recognized in the prior art.

SUMMARY OF THE INVENTION

Users of facsimile communications systems may test their transceivers by transmitting a test fax page over the public switched telephone network to a system that makes measurements of the test transmission and of telephone line characteristics. Measurements are analyzed to locate possible anomalies. Results of analysis, the measurements themselves and a copy of the user's test fax are incorporated into a test report. The test report is delivered to users as a fax message or spoken announcement during the same call or a second call. By providing a system that sends and receive fax messages like an ordinary fax transceiver but also can make and process measurements while it is doing so, it is possible to provide diagnostic information and advice quickly and automatically to users while they use their fax transceivers in ways to which they are already accustomed. By relying solely on standard communication exchanges of which all standard fax transceivers are capable, the system can universally provide useful diagnostic information and advice, no matter what the make and model of the transceiver.

In one mode of operation, the user initiates a test by automatically transmitting a sample document, such as a cover page or test chart to a special fax telephone number where the test system is located. During the transmission the system makes measurements of the incoming test transmission and the telephone line and learns the area code and telephone number of the calling fax transceiver. The system analyzes the measurements and prepares a test report, which is then immediately delivered to the caller by fax message or voice announcement. If the report is delivered by fax, it is sent to the area code and telephone number received during the test fax transmission. If callers request the test report by voice, they are asked to identify the tested fax transceiver by area code and telephone number and are then given test results related to the designated machine. The system maintains a call record for each call received in an activity log file, containing the measurements made and a copy of the received test fax image. The activity log may be accessed by modem by a remote computer system.

In another mode of operation, the user places a manual call to the fax testing system using a telephone handset associated with the fax transceiver. The system responds with a tone or a voice prompt introducing the system and the explaining the available options. Using Touch Tones SM generated by the fax transceiver's keypad, the user then selects from available options that include selecting the type of measurements desired, selecting how the test report should be delivered, identifying the telephone number where the test report should be sent and optionally identifying a method of payment for the test results. ("Touch-Tone" is a registered servicemark of AT&T.) After responding to the prompts and during the same call, the user transmits the test document. The user also can request information about the system and stop repeated attempts by the system to deliver a fax message to facsimile communications system that is out of order. Functions which do not involve transmitting a fax message may be accessed from a standard telephone set rather than a facsimile transceiver.

BRIEF DESCRIPTION OF THE DRAWINGS

FIG. 4 is a detailed flow chart of processing accomplished by the invention, including receiving test fax transmissions, transmitting test reports and other interactions with users and the system operator.

DESCRIPTION OF THE PREFERRED EMBODIMENT

STRUCTURE

Figure 1:
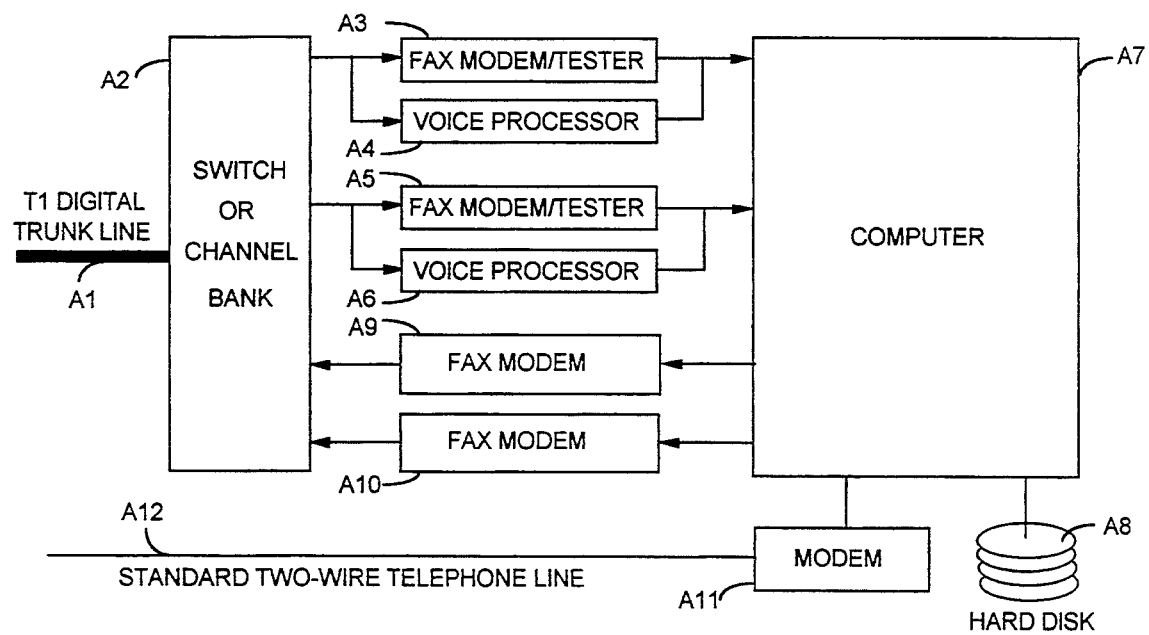
FIG. 1 is a block diagram of the invention.

FIG. 1 shows a block diagram of the facsimile testing system. To carry a significant number of simultaneous telephone connections, modem switched telephone networks digitally encode and intermix (multiplex) signals for several calls on trunk circuits. A T1 circuit, for example, carries 24 simultaneous telephone connections. In the present system, a T1 circuit A1 interfaces the system to the public switched telephone network. Typically the T1 circuit A1 will be connected directly to a long distance (interexchange) carrier such as AT&T, through which fax users can access the system nationwide on 800, 900, and normal telephone numbers. The T1 circuit A1 is also connected to a telephone switch or channel bank A2, which separates 24 individual telephone connections from the digital signal present on the T1 circuit A1. Certain of the 24 circuits receive inbound calls from users of the system; others are outbound circuits to be used to send test reports to users. Each inbound circuit is connected to both a fax modem circuit board with test capabilities and associated low level software A3, A5, and a voice processor circuit board with associated low level software A4, A6.

The GammaFax TM CP circuit board from GammaLink Graphic Communications, Inc., of Sunnyvale, Calif. may be used for the fax modem circuit boards with test capabilities, A3, A5 and the fax modem A9, A10. "GammaFax" is a trademark of GammaLink Graphic Communications, Inc. The DIALOG/41B TM from Dialogic Corporation of Parsippany, N.J., may be used for voice processor circuit board A4, A6. "DIALOG/41" is a trademark of Dialogic Corporation.

Circuit boards A3, A4, A5, A6, A8 and A9 are connected to the bus of a personal computer A7. Fax modems A9 and A 10 are connected to outbound telephone circuits provided by the switch or channel bank A2. Also connected to the computer A7 bus are a hard disk A8 and a modem A11. Modem A11 is connected to the public switched telephone network through a standard two wire circuit A12. A system operator can reach the modem A11 by calling a special maintenance telephone number separate from the telephone numbers available to users.

The simple embodiment described above can handle two simultaneous incoming test fax transmissions and two simultaneous outgoing test reports. The design of the invention is modular however, and can handle many simultaneous incoming calls by adding fax modem/tester circuit boards like A3, voice processor circuit boards like A4 and fax modem boards like A9.

Similarly, the system can be reduced to handling a single call at a time by using only one of each type of circuit board. In this case the T1 digital trunk line A1 and switch or channel bank A2 may be replaced by a standard two wire telephone circuit for both incoming and outgoing calls.

SIMPLIFIED FLOW CHART FOR THE BASIC TESTING MODE

Figure 2:
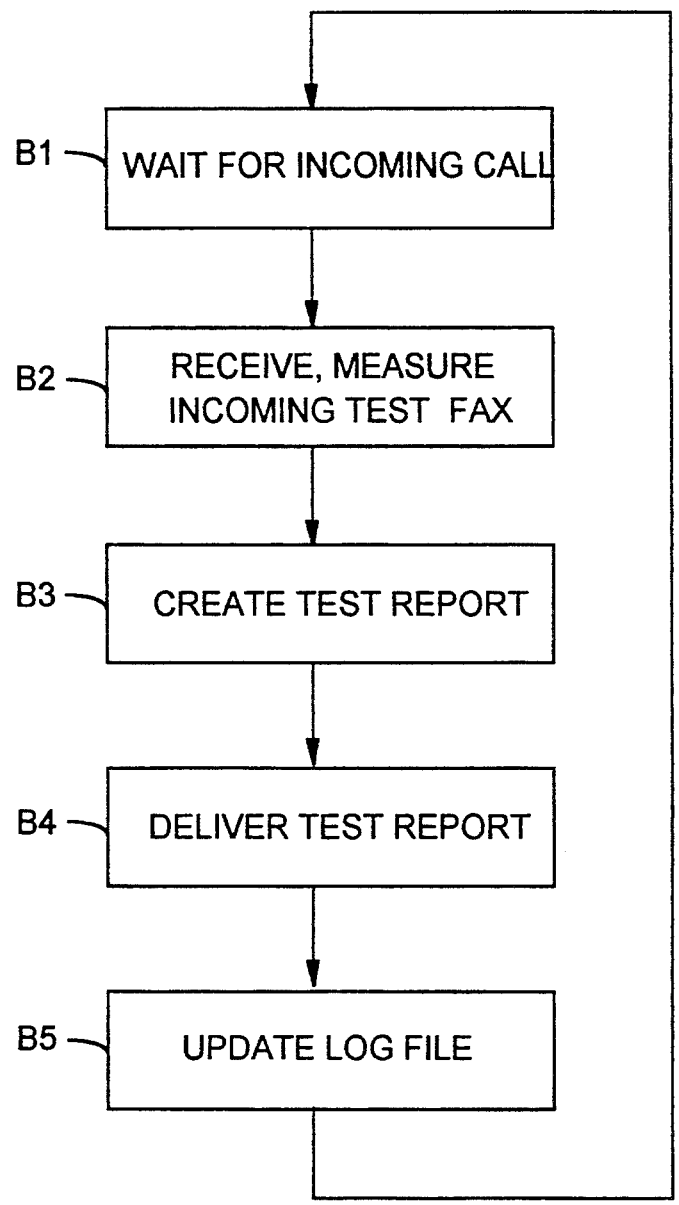
FIG. 2 is a simplified flow chart of the process of receiving test fax transmissions and delivering test reports.

FIG. 2 shows a simplified flow chart of the basic mode of operation of the system for automatically testing faxes. In step B1, the system waits for incoming test calls from users. Users may reach the system by calling a variety of telephone numbers, such as 800 numbers when sponsors pay for the costs of operating the system and 900 numbers when users pay.

At the beginning of the call in step B2, the service receives information from the telephone network identifying the call. This information includes Automatic Number Identification (ANI), which contains the telephone number of the caller. It also includes Dialed Number Identification Service (DNIS) which contains telephone number such as an 800 or 900 telephone number the user called to reach the system.

When the telephone connection is completed, the system responds as if it were a standard fax transceiver and receives the test fax transmission from the user. During the reception of the test fax transmission, the system performs and stores several measurements of the telephone line and the fax communication that is underway. It also saves data representing the test fax page sent by the user. At the beginning of the call, any standard fax transceiver conforming to the CCITT Group III standards will send its Transmitting Subscriber Identification (TSI) which contains the area code and telephone number where the fax transceiver is located. The system captures the TSI for later use. At the conclusion of the test fax transmission, the system disconnects from the telephone line, as if it were a standard fax transceiver that had just completed receiving a normal fax message.

In step B3, the system then processes the measurements and other information collected during the call and builds a file containing a custom test report. It reviews the measurements to see if any is outside of acceptable bounds and inserts one or more paragraphs into the test report for each unacceptable measurement. It also includes the measurements themselves in a table in the report. Finally a copy of the original test fax page sent by the user is appended to the report.

In step B4, the completed test report is then delivered to the user by facsimile or voice. The system must determine what fax telephone number should receive the test report. In practice, the TSI containing the user's fax telephone number is often missing or incorrect. This is so because the TSI must be programmed by the user into the fax transceiver and the fax transceiver may be successfully used even when the TSI is missing or incorrect.

The ANI received from the telephone network also represents the user's fax telephone number. Occasionally ANI is missing or it represents a central telephone number rather than an extension telephone number. The system sends the test report by fax to the ANI telephone number if it is present and appears to be accurate and to the TSI telephone number otherwise. If the designated facsimile transceiver is busy when the system calls, it tries the call again approximately every ten minutes up to 24 times.

The system maintains a log file that records all calls to the system. After the test report has been delivered, in step B5, the system adds a record to the log file containing the date and time of the call, the measurements made, a copy of the test fax page, and information relating to the delivery of the test report to the user. The system then waits for another call.

Because the system contains multiple incoming telephone lines and equipment to handle them, it is capable of handling multiple simultaneous calls. Even though a call may be at a certain stage in the process described above, the system is still ready for additional incoming calls.

SIMPLIFIED OPERATION OF THE BASIC TESTING MODE

To understand how the processing of the basic testing mode is performed by the main components of the system, refer again to FIG. 1. All incoming calls are received on a T1 digital trunk line A1. The switch or channel bank A2 decodes the digital signals from the digital trunk line A1 and distributes each new call to an available pair of circuit boards, such as fax modem/tester circuit board A3 and voice processor circuit board A4. For a call allocated to this pair of circuit boards, the voice processor circuit board A4 detects the ringing of the telephone line and goes "off hook" to answer the call. At the beginning of the call the telephone network sends ANI and DNIS signals and these signals are received and stored by voice processor circuit board A4. Once the telephone connection is fully established, the user's fax machine sends a calling tone (CNG) to initiate a facsimile transmission. The voice processor circuit board A4 detects this signal and passes appropriate data to the computer A7.

The computer A7 instructs the fax modem/tester circuit board A3 to take over the call in progress. The fax modem/tester circuit board A3 then receives and measures the test fax transmission from the user. At the conclusion of the call, both circuit boards disconnect from the call. The fax modem/test circuit board A3 then passes a call record to the computer A7 containing details of the completed call. The computer A7 then stores the record in a received queue file on hard disk A8.

When the computer A7 becomes available for further processing it retrieves the call record from hard disk A8 and prepares a test report. The completed test report is stored in a file and a record describing the destination for and filename of the test report file is stored in a queue file on hard disk AS.

When a fax modem such as fax modem A9 becomes available, the test report is retrieved from hard disk A8 and sent to the user.

Figure 3:
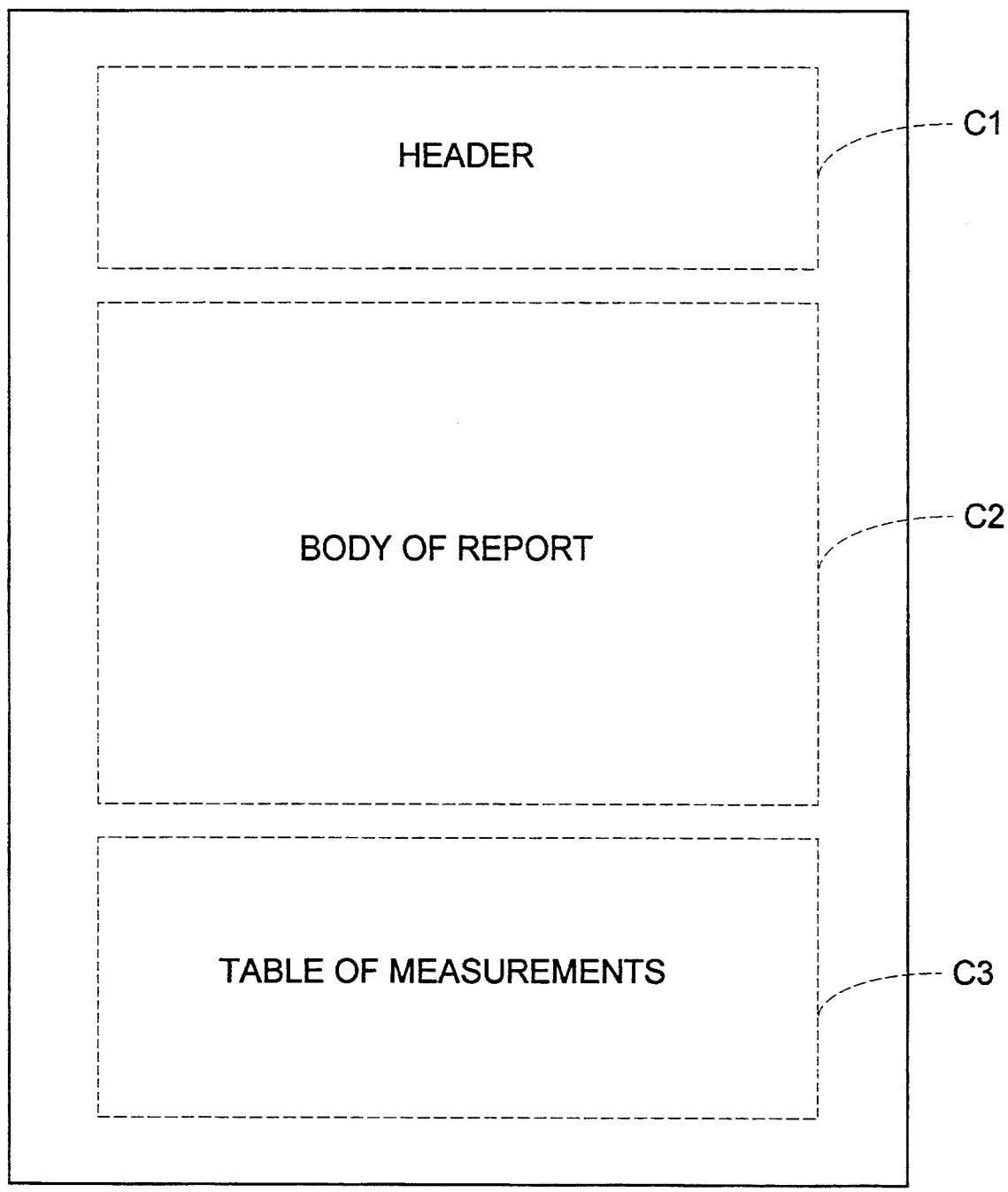
FIG. 3 shows the layout of the test report.

FIG. 3 shows the layout of a sample test report. The report content will vary widely depending on the measurements. A simple case associated with the embodiment listed in the Appendix is shown in the sample. The header C1 identifies the test report and its recipient. Sample text might consist of:

---

FAX TEST REPORT
Please report suggestions and problems with
the FaxChek system by fax to (408) 395-4595

---

DATE:   02-17-1992

-continued

FAX TEST REPORT
Please report suggestions and problems with
the FaxChek system by fax to (408) 395-4595

| | |
|---|---|
| TIME: | 08:21:59 |
| TO: | Fax Operator/User at (408) 354-1178 |
| FROM: | FaxChek Diagnostic Center at +1 900 329 2439 |

The body of the report C2 contains selected paragraphs resulting from the analysis of the measurements. Sample text might consist of:

Our facsimile diagnostic system recently received your test fax. Your transmission was analyzed automatically and the results are given below. See the FaxChek instructions for help in interpreting these results. The last page of this report is a copy of your original test fax that you can visually examine for defects. Thanks for using the FaxChek system.

Your answerback ('CSID,' 'TSI') is correctly set to your fax phone number.

Your line noise of −63 dBm was very quiet, which is good.

Your signal strength of −21 dBm was stronger than ideal. If your machine is serviced for other reasons, you should have it checked.

Our automatic analysis revealed no problems. Your fax machine and local phone service appear to be operating correctly. However, you may discover other problems by examining the image quality of this report as explained in the user's instructions.

The technical measurements leading to the above conclusion(s) are listed below. If you experience fax communications problems, these measurements may be of interest to your telephone company or fax machine serviceperson.

Table of measurements C3 contains the measurements themselves. Sample text might consist of:

| YOUR TEST FAX TRANSMISSION | |
|---|---|
| Time and date we received your test fax: | 08:21:55 02/17/92 |
| Your answerback (CSID): | 14083541178 |
| The number of pages you sent as your test fax: | 1 |
| Connect time in seconds: | 40 |
| TRANSMISSION SIGNAL MEASUREMENTS | |
| Your fax machine's transmission speed in bits/sec: | 9600 |
| Your telephone line noise in dBm: | −63 |
| Signal strength in dBm: | −21 |
| Signal to noise ratio in dBm: | 42 |
| Signal quality: | 131 |
| Error status: | 0 |
| TEST REPORT DELIVERY ATTEMPTS | |
| Previous times we called to deliver this report: | 0 |
| Last error status from previous delivery attempt: | None |

FaxChek is a servicemark of FaxChek Systems. (c) 1991, FaxChek Systems

The report may be followed by a protocol trace report and is followed by a copy of the test fax transmission if it was received during the user's test fax transmission.

SIMPLIFIED OPERATION OF THE INTERACTIVE MODE

The basic testing mode allows users to simply and automatically send a test fax transmission and receive a basic test report. The interactive mode, by contrast, allows the users to interact with the system by touch tones to select among alternative services and make other choices. The user initiates an interactive call by picking up the telephone handset on the facsimile transceiver and manually calling the system without sending a test fax transmission. Referring again to FIG. 1, processing of incoming calls is identical up to the point where the ANI and DNIS signals are received and stored by voice processor circuit board A4. Because the user is placing a voice call, the facsimile transceiver does not send the CNG tone to indicate that a fax transmission is desired. The voice processor circuit board A4 waits for four seconds but does not detect the CNG tone. It then makes a voice announcement similar to the following:

"Welcome to the FaxChek facsimile testing service. This call will cost $2.75. If you hang up before the tone, you will not be charged. (Pause, tone.) For an introduction to the FaxChek service, press 1. To begin a test press 2. For results from a previous test, press 3. To cancel further attempts by the FaxChek system to send to your fax machine, press 4. If you are having trouble using the service, press 5."

If the user presses 1, a spoken announcement describes the system and gives brief instructions by voice.

For choice 2, the system asks the user to select a basic test or a test with protocol trace. The system then asks the caller to enter the fax telephone number where the test report should be sent. It then asks the user send to a test document and then proceeds as in an automatic basic testing mode call. However, if the user selected the test with protocol trace then a special trace file is kept of all interactions between the user's facsimile communications system and the system. The trace report is later appended to the test report. The test report will be sent to the fax telephone number entered by the user rather than the TSI or ANI telephone number.

For choice 3 the system asks the user for the fax telephone number of a facsimile transceiver that has been tested during the last 24 hours. If the system has any test reports for that fax telephone number it tells the user how many reports are available and asks the user whether the reports should be delivered by fax or voice. If the user selects fax delivery, the system asks the user for the fax telephone number where the reports should be sent, records the number and sends the reports. If the user selects voice delivery, the test results are spoken to the user.

For choice 4, the system asks the user for a fax telephone number of a facsimile transceiver to which the system should discontinue sending attempts. This function is required because repeated ringing or partial deliveries of a document to a machine that is out of order can become annoying to the user.

For choice 5, a spoken announcement gives troubleshooting advice.

For each completed call, the system adds a record to the log file containing the date and time of the call, the caller's telephone number as reported by the telephone network (ANI, the telephone number the user called to reach the service (DNIS), the information entered by the user by touch tone, the measurements made, a copy of the test fax page, and information relating to the delivery of the test report to the user.

In all other respects, operation of the interactive mode is identical to the basic testing mode.

DETAILED OPERATION

FIG. 4 is a detailed flow chart for all processes in a preferred embodiment of the system, including the basic testing mode and the interactive mode. The flow chart shows the process of answering an incoming call. The description below refers to individual fax modem/tester circuit boards, voice processor circuit boards or fax modem circuit boards by way of example only. In actual operation one of several identical components may be handling a particular step depending on how many calls are in progress at the time.

Step D1 represents the start of a process that takes place when ringing is detected on any available inbound channel, where each channel consists of a voice processor circuit board like A4 and a fax modem/test circuit board like A3. Ringing is caused by a call initiated by a user of the system, who may be making an automatic or voice call.

In step D2, an available voice processor circuit board A4 responds to the ringing by answering the call. Using special services available in the connection with the long distance network, two pieces of information are received before the caller's side of the connection is established. This information consists of the telephone number of the caller's facsimile transceiver or voice telephone, ANI (Automatic Number Identification), and the number the caller dialed to reach the service, DNIS (Dialed Number Identification Service). The system is available through several telephone numbers and it needs to log which number was used.

In step D3, the callers side of the connection is established. If the current call is a Group III facsimile transceiver making an automatic transmission of a test fax transmission, then the transceiver will transmit a calling tone, CNG, at 3.5 second intervals. The voice processor circuit board A4 monitors the line for 3.5 seconds and determines whether CNG was transmitted or not. If not, the call is assumed to originate with a person seeking to interact with the system and control passes to step D19, described further below.

In step D4, which takes place if CNG was detected in step D3, the system prepares to receive a test fax transmission. Information collected by the voice processor circuit board A4, including date and time of call, ANI and DNIS are temporarily stored in a record in voice queue file on hard disk A8 for later use. Control is passed to the fax modem/tester A3.

In step D5, fax modem/test circuit board A3 exchanges preliminary information (handshaking signals) with the calling facsimile communications system. Information captured from the calling facsimile transceiver during this exchange includes:

TSI (Transmitting Subscriber Identification), the telephone number of the facsimile transceiver
DCS (Digital Command Signal), identifying a set of capabilities to be used for the transmission
NSS (Non-Standard Setup), identifying the manufacturer of the transceiver and any non-standard features to be used during the call In step D6, the calling facsimile transceiver transmits a modem "training signal" of known content so that the system's fax modem can adapt to the signal's characteristics and determine if reception will be sufficiently error free to complete the transmission. The fax modem/test circuit board A3 measures signal strength and signal quality. During a silent period, fax modem/test circuit board A3 measures telephone line noise. The three measurements are saved for use in the test report.

In step D7, the calling facsimile transceiver transmits its test fax page and fax modem/test circuit board A3 receives the page image and stores it in a file on hard disk A8.

In step D8, the calling facsimile communications system and the fax modem/test circuit board A3 exchange messages to determine if the message transmission has completed successfully. An Error Status code identifying the success or type of failure of the transmission is determined.

Fax modem/test circuit board A3 disconnects from the telephone line and saves the error code and all other measurements taken as a record in a received fax queue file on hard disk A8.

In step D9, the oldest record in the received queue file is retrieved in preparation for building a test report. In the simplest case where only one call is handled at a time, this record is the one stored in the previous step D8. The voice queue file record corresponding to the same call is also retrieved. The voice record contains additional information about the call and the choices made by the user in steps described below.

In step D10, the process of building a test report file begins by storing a header identifying the date and time the test fax transmission was received, the telephone number of calling facsimile transceiver and the telephone number the user called to reach the service. A paragraph introducing the test report is added. The Signal to Noise Ratio measurement is calculated from the Signal Strength and Line Noise measurements. Measurements made during the test fax transmission are reviewed to determine if any measurement is outside of acceptable bounds. The following evaluations are performed:

| Measurement | Test |
| --- | --- |
| TSI | Check TSI for conformance to CCITT specification, equivalence to ANI and to telephone number entered in step D24 |
| Line Noise | Select the range of values that the line noise value falls within to select a paragraph for test report |
| Signal to Noise Ratio | Select anomaly paragraph for test report if Signal to Noise Ratio is less than 25 or different paragraph if 26 to 29 |
| Error Status | Select test report paragraph based on Error Status. |
| Signal Quality | Select Signal Quality threshold based on transmission speed used and add warning paragraph if measured value is worse than the threshold value |
| Transmission Speed | Add warning paragraph if less than 9600 bits per second |
| Number of Pages Rec'd | Add warning if more than one page was received. Add a different warning if no page was received |

Each of the evaluations made above can result in the addition of one or more paragraphs to the test report.

In step D11, the actual measurements are assembled in a table with informative descriptions. A legal notice is added. This step concludes the assembly of the main body of the report.

In step D12, if the user requested a protocol trace in step D22, the raw trace information is formatted into a trace report and added at the end of the report. In either case the test fax page image that was stored in step D7 is added to the test report.

In step D13, the completed report is stored in a file and a record is stored in a transmit queue file describing the desired fax test report transmission. If the user entered a valid destination fax telephone number in step D22, the test report will be sent to it. If the number entered by the user is not used and ANI was received and appears to be a valid telephone number, the test report will be sent to the ANI telephone number. If ANI is not used, the test report will be sent to the telephone number represented by TSI. The oldest record in the transmit queue file is read and transmission is attempted by an available fax modem circuit board such as A9. In the simplest case where only one call is handled at a time, this record is the one stored in the current step D13.

In step D14, if the test report was successfully transmitted or if during the attempt it appeared that a voice telephone number rather than a facsimile transceiver was called, control passes through D16 (designated with the letter A) to step D17. All steps marked with the letter A flow to step D17.

In step D15, if the test report was not successfully transmitted after 24 tries, control passes to step D17. Otherwise the number of attempts to deliver the report and the error status from the last attempt are updated in the table of measurements in the test report and a new transmit queue file record is established so that transmission will be tried again by step D 13.

In step D17, which is processed after any point marked with the letter A, the log file stored on hard disk A8 is updated with a call record containing the raw measurements and other information collected during the call, the number of attempts that were necessary to deliver the test report and the status of the last attempt to deliver the report.

In step D18, the processing resulting from a call to the system is concluded. At this point the system will attend to other necessary processing or begin the processing of a new call with step D1.

If in step D3, at the beginning of the call, no calling tone (CNG) was received, the caller is presumed to be a user desiring an interactive session rather than facsimile transceiver making and automatic transmission and control passes to step D19.

In step D19, voice processor circuit board A4 plays a stored voice message consisting of a preamble and a voice menu, for example:

"Welcome to the FaxChek facsimile testing service. This call will cost $2.75. If you hang up before the tone, you will not be charged. (Pause, tone.) For an introduction to the FaxChek service, press 1. To begin a test press 2. For results from a previous test, press 3. To cancel further attempts by the FaxChek system to send to your fax machine, press 4. If you are having trouble using the service, press 5."

In step D20 the voice processor circuit board A4 receives the caller's response to the voice menu, which should consist of a touch tone for a digit one through five. Control passes to one of five further steps depending which number key the user pressed on the facsimile transceiver's or telephone's keypad.

If the user presses 1, control passes to step 21 and a spoken announcement describes the system and gives brief instructions by voice.

If the user presses 2, control passes to step D22. The system asks the user to select a basic test or a test with protocol trace. If the user selects a protocol trace, a special trace log is kept of all interactions between the user's facsimile transceiver and the fax modem/tester circuit board A3. The system then asks the caller to enter the fax telephone number where the test report should be sent. The caller can, for example, request that the report be directed to a service technician's facsimile transceiver rather than the caller's or to a different facsimile transceiver at the user's office if the tested facsimile transceiver is incapable of receiving. The system then asks the user send to a test document. Control then passes to step D4.

If the user presses 3, control passes to step D23. The system asks the user for the fax telephone number of a facsimile transceiver that has been tested during the last 24 hours. It searches the portion of the log file representing the last 24 hours for call records corresponding to the designated fax telephone number and counts the number of such reports located. In step D24, the user is told how many reports have been located and asks whether they should be delivered by voice or by fax.

In step D25, the choice of voice or fax delivery is received. If the user chooses voice delivery, control passes to step D26, otherwise to step D9.

In step D26, test results corresponding to call records located in the log file during step D23 are announced to the user by voice processor circuit board A4 in a process corresponding to the generation of a written test report in step D9 through D12.

If the user presses 4, control passes to step D27. The system asks the user for a fax telephone number of a facsimile transceiver to which the system should discontinue transmitting attempts. This function is required because repeated ringing or partial deliveries of a document to a machine that is out of order resulting from repeated retries step D13 can become annoying to the user.

In step D29 the system locates any transmit queue file records and test reports corresponding to the designated fax telephone number that are waiting to be transmitted by step D13, deletes them so that they are not tried again and passes the information in them to step D17.

If the user presses 5, control passes to step D27. A spoken message gives troubleshooting advice.

At the conclusion of any call to the system that was placed to a 900 number, the telephone carrier saves special billing information and bills users through arrangements with local telephone carriers. The high degree of automation and low cost of 900 billing allows the service to be made available publicly at low cost. Any public user may thus make an automatic test fax transmission to the system with no prior arrangement, without having to identify his or her identity, name and address for billing purposes.

POSSIBLE MODIFICATIONS AND ADDITIONS

Modifications and additions can be made to the embodiment disclosed above without departing from the invention as defined in the claims below.

Facsimile transceivers conforming to Group II and Group IV CCITT standards and copiers with communications capability can be tested as well as Group III transceivers.

The voice processor circuit board, the fax modem/tester circuit board and fax modem circuit board could be combined into a single circuit board. Additional capability on the circuit board could substitute for computer A7. Delivery of test reports could be made through fax modem/tester circuit boards A3 and A5 instead of separate fax modems A9 and A10. Fax modem/tester A3 or A5 could be used instead of a separate modem A11. All the components shown in FIG. 1 can be integrated into a conventional facsimile transceiver, so that the resulting transceiver is capable of normal fax message traffic as well as diagnosis of other machines. A conventional facsimile transceiver with a port such as an RS-232C port could be combined with a computer to provide all necessary functions.

Instead of pairing voice processor circuit boards such as A4 with fax modem/tester circuit boards such as A3, the assignment of fax modem/tester circuit boards to individual voice processor circuit boards could be controlled by a crosspoint switch. Since calls for information only do not require a fax modem/tester circuit board, a smaller number of boards can be used to service only the calls requiring fax services.

The voice processor circuit boards can be eliminated. An incoming call is then answered in step D2 directly by a special fax modem/test circuit board with tone generation and touch tone decoding such as the GammaFax CP/DFX circuit board from GammaLink Graphic Communications, Inc. This method is used in the source code in the Appendix. ANI and DNIS are then received by the special circuit board. Instead of steps D19, D20 and D21, the circuit board prompts the user with a simple tone. The user then enters much tone sequences separated by the pound or star key to make choices that would have been made in steps D20, D22, D23, D24, and D28. Options that involve delivery of information by voice and their associated steps D21, D26 and D27 are unavailable.

Requested information including test reports could be delivered to callers by means of electronic mail, computer networks or by modem or touch tone signaling over the public switched telephone network.

Digital trunk line A1 can be a standard two-wire switched circuit, an ISDN link, a dedicated instead of a switched line or any other form of communications link. Switch or channel bank A2 can be eliminated when one or more individual telephone circuits are available.

Pulse dialing or voice command recognition could be used in place of detection of touch tones.

An optical disk or semiconductor memory could be used in place or hard disk A8.

The system can decode in step D10 the DCS signal received from the calling facsimile transceiver during step D5 and include information in the test report on transmission options chosen by the facsimile transceiver such as the data rate, minimum scan line time, 2400 bit per second handshaking capability, error correction mode and maximum recording width capability.

The system can make a second set of measurements of the facsimile transceiver that is being tested and its telephone line at the time the test report is starting to be sent back to the facsimile transceiver. The results of these additional measurements can be incorporated later in the body of the report before transmission to the user.

The system also can store the results of several incoming test fax transmissions and summarize the overall results in the test report. Since problems with both facsimile transceivers and telephone lines can be intermittent, such a test discovers more problems than a single test.

The system can deliver the test report to the calling facsimile transceiver during the original test fax transmission instead of during a separate call if the facsimile transceiver is capable of "turn-around polling." This feature allows fax messages to be transmitted in both directions during a single telephone connection.

Instead of sending an arbitrary page as a test fax transmission, the user can send a standard test chart of known content, such as CCITT Test Chart No. 3 as described in the CCITT Blue Book, Volume VII, Fascicle VII.3, Recommendation T21. Examination of its image resumed with the test report allows assessment of resolution and image quality. The image of the chart received during the transmission of the test fax page can also be analyzed during step D10 for various defects and the probable causes of such defects are identified in additional paragraphs in the test report. For example a vertical white band in the image with sharp definition at the edges is frequently caused by dirt or a scrap of paper blocking access to a portion of the document scanner in the calling facsimile transceiver. Several vertical white bands with blurred definition at the edges are often caused by poorly adjusted scanners. Small black specs (pixels) scattered randomly in horizontal bands the full width of the image are typically caused by intermittent line noise. A thin, perfectly straight vertical black line a multiple of one pixel wide is usually caused by a defective scanner or primer element. Stretched or compressed images can be caused by defective document handling mechanisms.

During the transmission of the modem training signal in step D6, the system can perform a spectral analysis of the signal using a fast fourier transform. The resulting spectrum can be compared with various profiles to identify probable problems with the transmit equalizer in the calling facsimile transceiver, reactance or metallic problems with telephone lines, improper loading coil placement on telephone lines and the presence of telephone line digital carrier systems that interfere with the facsimile signal.

By analyzing signals sent by the calling facsimile transceiver during steps D5 and D6, the system can measure steady state distortions such as phase modulation, phase jitter, amplitude modulation and amplitude jitter. Similarly, transient distortion in phase and amplitude, impulse noise, drop outs, retrainings and data rate changes can be measured. All measurements can be compared with acceptable bounds in step D10 and paragraphs added to the test report as appropriate.

The raw measurements can be formatted aM added to the table of measurements in the test report in step D11.

The testing process could begin with a test fax transmission originating with the system rather than a user of the facsimile transceiver. The system could automatically schedule monthly or quarterly tests. In this way regular preventive maintenance can be conducted automatically by the system on a regular schedule.

The system could automatically deliver a special test report to a special destination in addition to the one specified by the user, such as a manufacturer's service center.

The system can maintain a database of user accounts on hard disk A8 to manage prepaid usage accounts limited by time and number of calls. During step D2, the received ANI, representing the telephone number of the calling facsimile transceiver is searched in the user account database on hard disk A8. Each ANI in the database has an account record containing a personal information number (PIN), the number of calls made by the account, a maximum number of calls allowed for the account and an account expiration date. When the account record is located, if the number of calls previously made is less than the maximum and the account is not expired, the number of calls made is incremented and the call proceeds to step D3. Otherwise the caller is informed that the account is expired. The user is informed of ways to establish a new account and of alternate billing arrangements and the call is terminated. If an account record for a user is not located, the user is offered the option of establishing an account by entering a PIN, supplied by a sponsor of the system. When a valid PIN is correctly entered, an account record is then established with a maximum number of calls and an expiration date in accordance with the sponsor's policies. A valid account may be assigned to a different facsimile transceiver by calling from the new facsimile transceiver so as to send a new ANI and responding to voice prompts. PINs defined for user accounts that last the duration of a new facsimile transceiver warranty period can be sponsored by the transceiver's manufacturer or by a reseller of the facsimile transceiver.

The system can be enhanced with a credit card billing option. In step D22, the user can be asked for a credit card number that the system should bill for the cost of the test. In a new step preceding step D4, the system would connect by modem with an automated credit card system, transmit the card number and amount and receive an authorization number to be stored with the call record in step D17.

The system can be made available simultaneously through different telephone numbers, each of which is routed through a different long distance carder. If a test report indicates a telephone line problem, the user can determine if the problem is caused by the long distance carrier by conducting further tests using alternate carriers and comparing the resulting test reports.

In step D22, the system could ask the user to identify the make and model of the facsimile transceiver that is being tested. Using information on the capabilities of various models stored on hard disk A8, the system could test additional model-specific features. For models containing a remote diagnostics feature, the system could collect diagnostic and activity log information stored in the facsimile transceiver and perform additional analysis and reporting. The system could also refer the user when appropriate to a technical support telephone number sponsored by the manufacturer of the facsimile transceiver.

During step D22, the system can ask the user to identify various symptoms that cannot be detected through the automatic interaction between the user's facsimile transceiver and the system. This information can be analyzed along with the measurements to generate more specific advice. For example, while the system can measure images sent by the user, it has no way to measure the visual quality of test reports or other documents received by the user. The system can ask, for example, "Do all your received faxes have straight black vertical lines in the same position on the page?" If measurements indicated no scanner problem, the system would add a paragraph to the test report identifying the facsimile transceivers printer as the most likely cause.

The system can track its own system errors as well as the log file and test fax transmissions and generate a variety of reports based on the accumulated information. Reports could include, for example, reliability statistics on various facsimile transceiver models. The accumulated information can be periodically downloaded to a system operator through modem A11 or fax modem A9 or A10. The accumulated information could be periodically purged.

The system can be provided with a system operator's interface activated through modem A11 or one of the fax modems. The system operator can connect to the system using a remote computer and have the option of monitoring the call handling activities of fax and voice circuit boards assigned to telephone lines, examining the flow of measurements and test reports, re-initializing the software, enabling the printing and logging of test fax transmissions, performing hardware tests on components of the system, and exchanging files such as reports, the log file, the error file or the user account database with a remote computer.

It is intended that the claims below be interpreted as including the above modifications and additions as well as others suggested by the reading of the above descriptions and drawings.

RAMIFICATIONS

The system relies only on information available in interchanges defined by international standards. It is thus compatible with all facsimile transceivers conforming to the standards. Because the system requires only standard sending and receiving actions by the user and the test results are analyzed and explained in layman's language, the system is uniquely capable of being used by ordinary fax users as well as technicians. The process of conducting a test is not a special procedure but involves the exercise of normal transmission and reception functions. Events observed during this exercise by the user can provide additional troubleshooting clues.

The system is fully automated and can be constructed from inexpensive components, so that it can be offered at little or no cost to all callers. In this regard the system is superior to expensive, specially built test equipment that can be operated only by trained technicians. Because it is constantly available with no technician required, it speeds up the preliminary stage of problem diagnosis at an early stage of troubleshooting when the user does not even know which vendor's technician to contact.

Returning a copy of the user's test fax transmission as part of the test report allows the user to compare it with the original test page, examining its image quality after passing twice through the telephone network. Specific types of degradation of the image can often be detected by visual examination that are not detected by the system's analysis. The user is given the reassurance of seeing image quality first hand; this is not usually possible because normal fax transmissions are always sent to a remote location.

Extensive test results from large numbers of test fax transmissions are accumulated in the log file. Facsimile transceiver manufacturers can analyze the file to evaluate performance of their facsimile transceiver models in the field, make comparisons with competitive products, determine the need for possible product field upgrades or recalls and design new transceiver models.

The system is capable of making telephone line measurements specifically of the caller's local telephone loop even though most fax transmissions involve two local loops and a long distance carrier. The system is usually connected to the public switched telephone network by means of a digital trunk line directly to a long distance network. This type of connection eliminates the second local loop that is present in a typical fax connection, and with it a source of noise and other line impairments that could interfere with remote local loop measurements. The selected long distance carrier itself will be a high reliability all-digital network that would rarely interfere with measurements.

Fax problems frequently are detected when two facsimile transceivers appear incapable of communicating with one another. Often there is no clue indicating which of the two is the cause of the problem. Users of each transceiver can perform a test using the system. The location of the system in the middle of a long distance network isolates the two local telephone loops, allows separate but equivalent tests of the two facsimile transceivers and their local loops. Comparison of the two test reports will often indicate the source of the problem.

Facsimile technicians frequently have to make field adjustments to installed facsimile transceivers, particular of modem signal strength. Previous to the present invention, technicians have had to have a second technician available at a second remote location to make signal strength measurements using manual equipment. The invention allows such adjustments to be made by the single field technician at considerable savings.

Facsimile transceivers contain many moving parts that wear out, some of them delicate. They process documents that may contaminate the document path and scanner and use fax paper that gradually abrades the print head and other components in the paper path. Telephone lines, particularly in the local loop, can slowly degrade as wiring and connections age. As a result, facsimile transceivers and their telephone lines require preventive maintenance for reliable operation. Using the present system, users may run periodic tests for purposes of preventive maintenance. Resulting test reports can reveal emerging problems such as increases in telephone line noise or dirt on document scanners. Users can then take corrective action before their vital fax communications capability is disrupted. The cost of regular technician visits can be reduced and the reliability of fax communications enhanced.

APPENDIX

The following Appendix contains the source code for a simple embodiment of the system for use with GammaFax CP/DFX fax circuit boards. It does not use voice processor circuit boards but relies instead on a tone prompt and touch tone input for user selection as described above.

```
'*******************************************************************
'*** FXCHK.BAS FAX DIAGNOSTIC PROGRAM                            ***
'*** Copyright (c), 1991, 1992 by Richard R. Meyer.              ***
'*** All rights reserved.                                        ***
'*******************************************************************
'
'     Source for Microsoft QuickBasic V. 4.5
'        Use with GammaFax CP/DFX fax circuit boards
'        Use MSDOS 3.3 not 4.01 or GammaLink crashes!
'
'     DOS Command line switches, e.g. QB FAXCHEK /P /A612
'
'     /Axxx    where xxx is local Area code to avoid dialing
'     /Cxxx    where xxx is accounting code to dial after outbound call
'     /Dx      where x is Dialing prefix for long distance, eg 1
'     /Oxx     where x is string to dial to get outside line
'              ";" in string waits for secondary dial tone, eg 9;
'     /Lx      where x is loss between system and phone CO in dBm
'     /P       Enable Print all incoming faxes toggle
'
'     File Contents:
'
'     FXCHK1.CMD=  GCL script to read rec'd Q + build FXCHK1.LOG
'     FXCHK1.FMT=  Format of FXCHK1.LOG
'     FXCHK1.LOG (LOGFILE$, GLOG$)= Temp log of Rec'd measures
'
'     FXCHKnn.TXT= Formatted Rec'd measures files for test report
'     OUTDOC$=     Working name for the current FXCHKnn.TXT
'
'     FXCHK2.CMD (G2CMD$)= Temp GCL script for sending test report
'
'     FXCHK3.RPT=  Temporary activity log of rec'd measurements
'     FXCHK5.CMD=  Resubmits most sent faxes, to "spoon-feed" Q
'     FXCHK.RPT=   Activity log of rec'd & sent measurements, unused
'     FXCHK.RPB=   Old activity log for downloading
'     FXCHK3.CMD=  GCL script to read sent Q + build FXCHK2.LOG
'     FXCHK2.FMT=  Format of FXCHK2.LOG
'     FXCHK2.LOG (LFILE2$) = Log of Sent measures
'
'     SFILE$= Current send filename extracted from FXCHK2.LOG
'     USER00?.TIF Literature page files, must mark with ATTRIB +R
'*******************************************************************
'*** INITIALIZATION                                              ***
'*******************************************************************
'  Wait until disk thrashing by Q mgr
'  stops before proceeding by invoking SLEEP10.EXE from GFQM.BAT
'  before running this program!

'  FNLINENOISE calculates the ambient phone line noise in dBm given
'  a raw value, according to the table on p 42 of the GPI manual.
'  Some values are off by 1 or 2 dBm--who can do it better?
'  See the book Numerical Recipes for fitting a polynomial
Init:
    '  Returns strng$ right-justified in a string wid% wide
    DECLARE FUNCTION RT$ (strng$, wid%)

'  Returns strng$ left-justified in a string wid% wide
    DECLARE FUNCTION LT$ (strng$, wid%)
```

```
' Prints strng$, right-justified in a field wid% wide at current position
DECLARE SUB PRT (strng$, wid%)

' Adds record to FXCHK.RPT with rec'd measures only, and UserCmd$ as "Cmd" in report
DECLARE SUB ReportRecord (UserCmd$)
COMMON SHARED UserID%, board%, Q$      ' used in Main and SUB ' Updates time and call counts every minute
DECLARE SUB CheckTime ()

' Keeps call counts table and current time on screen
DECLARE SUB timehandler (Dummy%)
' arrays:
' Inbound fax calls for each board for each of last 60 minutes,
' as printed on console screen. Totals in callminutes%( i%, 60)
' main module updates a specific array element when a call comes in DIM callminutes%(8, 60)
DIM callhours%(8, 24)

' New line noise function from Bruce Morley's program
' Approximated line noise in dBm, given raw Gamma CP line noise value
DEF FNLINENOISE (X) = CINT(-79.2575 + 4.891867 * LOG(X))
'DEF FNLINENOISE (X) = CINT(4 * (LOG((X + 0) / 6500000) / LOG(2.2)))

' FNSIGSTREN calculates modem signal strength in dBm given raw value
' according to table on p 40 of GPI manual.
DEF FNSIGSTREN (X) = -CINT(40 - (((X - 6700) / 3275) * 5))

ON ERROR GOTO ErrorHandler

'constants:
CONST ver$ = "1.07"  ' version number of exe file
CONST true = -1
CONST false = 0
CONST fast = 1
CONST slow = 1000
CONST FaxBack% = true     ' false means don't fax back the rec'd test pages
CONST SendInterval$ = "10" ' range "01" to "59" minutes between send fax tries
CONST RetriesLimit% = 24 ' Max allowable value = 99 No. of time to try sending faxes
Q$ = CHR$(34) ' the quote " character for building comma delimited report records ' Random file record for temp storage of recd measurements in FXCHK3.RPT
TYPE Recdrecord
        free AS INTEGER     ' boolean flag, true if record is available
        f1   AS STRING * 20 ' User Id assigned by FaxChek not from Q rec.
        f2   AS STRING * 20 ' Fax board that recd call
        f3   AS STRING * 20 ' Time and date
        f4   AS STRING * 20 ' Your answerback
        f5   AS STRING * 20 ' Submission time
        f6   AS STRING * 20 ' Line Noise
        f7   AS STRING * 20 ' Signal Strength
        f8   AS STRING * 20 ' Signal Quality
        f9   AS STRING * 20 ' Error Status
        f10  AS STRING * 20 ' PhoneNoIn$
        f11  AS STRING * 20 ' UserCmd$
        f12  AS STRING * 20 ' PIN$

END TYPE

DIM SHARED Recdrec AS Recdrecord ' used in Main and SUB ReportRecord

'defaults
speed = fast         'delay after most print to screen statements
test = false         'skip printing letterhead on test reports and
                            'print errors to printer except 53 or 0
show = false         'show program progress print to screen messages
NoPrint% = true      'disable printing -- no printer at service bureau
faxprint = false     'print each incoming fax page to Laserjet
savfaxes = false     'not implemented. Would accumulate faxes on disk
AreaCode$ = ""       'area code not to dial on outbound calls since local
dialprelong$ = ""    'Digit(s) to dial prior to area code for long distance
OutsideLine$ = ""    'Digit(s) to dial to get outside line
AcctCode$ = "999"    ' Accounting code for U.S. Audiotex Siemans switch
                            ' delay 1.5 seconds after dialing, then dial 999

ReportPIN$ = "444234586761" '
                            ' PIN password triggering downloading of FXCHK.RPB to
                            ' caller's TTI. Caller must have GammaFax board COdBloss = 2         'Signal loss between phone Central Office and FaxChek in dBm
                            'Add to Signal Strength, Line Noise measures-on test report
                            'Default 0 dBm is for 395-4593,4,5 to Los Gatos CO = -8 dBm ' command line parser
parmline$ = COMMAND$
slash% = INSTR(parmline$, "/")
WHILE slash% <> 0
   parmline$ = MID$(parmline$, (slash% + 1))
```

```
            verb$ = LEFT$(parmline$, 1)
            space% = INSTR(parmline$, " ")
            ' watch for end of line IF space% = 0 THEN space% = LEN(parmline$) + 1
        IF space% <> 0 THEN
                parm$ = MID$(parmline$, 2, (space% - 2))
                SELECT CASE verb$
                    CASE "p", "P"
                                NoPrint% = false
                    CASE "s", "S"
                                speed = slow
                    CASE "a", "A"
                                AreaCode$ = parm$
                    CASE "c", "C"
                                AcctCode$ = parm$
                    CASE "d", "D"
                                dialprelong$ = parm$
                    CASE "t", "T"
                                test = true
                    CASE "l", "L"
                                COdBloss = VAL(parm$)
                    CASE "o", "O"
                                OutsideLines$ = parm$
                END SELECT
        END IF
        slash% = INSTR(parmline$, "/")
    WEND ' Count number of used records (outbound faxes) in FXCHK3.RPT
    ' to display on screen as "Current Outbound Faxes: "
    OPEN "FXCHK3.RPT" FOR RANDOM AS #4 LEN = LEN(Recdrec)
    NumberOfRecs% = LOF(4) / LEN(Recdrec)
    OutFaxLoad% = 0
    recno% = 1
    RecdFaxes% = 0  ' but it would be better to count them first DO WHILE recno% <= NumberOfRecs%
            GET #4, recno%, Recdrec
            IF Recdrec.free = false THEN OutFaxLoad% = OutFaxLoad% + 1
            recno% = recno% + 1
    LOOP 'extract Sent CSID string from GFAX.$DC for use in report boilerplate
    OPEN "i", #1, "GFAX.$DC"
    DO WHILE NOT EOF(1)
            LINE INPUT #1, tbuf$
            IF LEFT$(tbuf$, 4) = "CSID" THEN
                    SendCSID$ = MID$(tbuf$, 8)
                    EXIT DO
            END IF
    LOOP
    CLOSE #1

COLOR 7, 0  ' white on black
    CLS
    Column% = 71
    GOSUB PaintScreen

'****************************************************************
    '*** MAIN LOOP--look for received faxes, send test rep.s, report  *
    '****************************************************************
    '
DO
    CALL CheckTime  ' replaced with ON TIMER above ' Show program is running by continuously printing row of Xs
    IF ((Column% = 81) AND (show = false)) THEN
                ' clear line with blanks and start over
                Column% = 71
                LOCATE 24, 71
                PRINT "          ";
    END IF
    LOCATE 24, Column%
    COLOR 14, 3
    IF show = false THEN PRINT "X";
    COLOR 11, 1
    Column% = Column% + 1

' look for single key menu command
    onekey$ = INKEY$
    IF onekey$ <> "" THEN
                SELECT CASE onekey$
                        CASE "f", "F"
                                COLOR 4, 3: LOCATE 24, 9
                                PRINT "Now COPYing received non-text fax files to Drive A:           "; : SLEEP 2
                                SCREEN , , 1
                                SHELL "copy ?0??Q0??.TIF A: > nul"
                                SCREEN , , 0
```

```
                COLOR 4, 3
                LOCATE 24, 9
                PRINT "Delete copied fax files? (Y/N):             ";
                yn$ = INPUT$(1)
                IF UCASE$(yn$) = "Y" THEN KILL "?0??Q0??.TIF"
                LOCATE 24, 9
                PRINT "                                             ";
                COLOR 11, 1

'CASE "t", "T"
        '      IF test = true THEN
        '            test = false
        '            SHELL "LOADHI GCL init.cmd > nul"
        '      ELSE
        '            test = true
        '            SHELL "LOADHI GCL inittest.cmd > nul"
        '      END IF CASE "s", "S"
                IF speed = slow THEN speed = fast ELSE speed = slow CASE "p", "P"
                IF NoPrint% = true THEN
                        COLOR 7, 0: LOCATE 25, 1
                        PRINT "Printing disabled by COMMAND$ = /P      "; : SLEEP 2
                        COLOR 11, 1
                ELSE
                        IF faxprint = false THEN faxprint = true ELSE faxprint = false
                END IF CASE "r", "R"
                ' need a different print that can be aborted somehow
                COLOR 4, 3: LOCATE 24, 9
                PRINT "Now printing FXCHK.RPT > PRN.               "; : SLEEP 2
                SHELL "type FXCHK.RPT > PRN"
                LOCATE 24, 9
                PRINT "                                             ";
                COLOR 11, 1

CASE "c", "C"
                COLOR 4, 3: LOCATE 24, 9
                PRINT "Now COPYing FXCHEK.RPT activity log file to Drive A:    "; : SLEEP 2
                SCREEN , , 1
                SHELL "copy FXCHK.RPT A:"
                SCREEN , , 0
                COLOR 4, 3
                LOCATE 24, 9
                PRINT "Delete activity log? (Y/N):                ";
                yn$ = INPUT$(1)
                IF UCASE$(yn$) = "Y" THEN KILL "FXCHK.RPT"
                LOCATE 24, 9
                PRINT "                                             ";
                COLOR 11, 1

CASE "d", "D"
                SCREEN 0, 0
                PRINT "Type EXIT to return to FaxChek system"
                SHELL ' exit to DOS with possibility of RETURN using EXIT
                COLOR 0, 0
                CLS
                COLOR 11, 1
                GOSUB PaintScreen
                CALL timehandler(0)

CASE "i", "I"

RESET
                        KILL "?0??P0??.TIF" ' this won't kill any ?0??Q0??.TIF non-test faxes
                        KILL "FXCHK*.TXT"   ' outbound test report text file
                        KILL "GCL*.$LS"  ' old extension
                        KILL "GCL*.LST"  ' new extension
                        KILL "FXCHK1.LOG"
                        KILL "FXCHK2.LOG"
                        KILL "FXCHK3.RPT"
                        SHELL "LOADHI GCL INIT.CMD > NUL"
                        GOTO Init CASE "e", "E", "x", "X"
                        RESET
                        END ' was STOP for debugging
                        GOSUB PaintScreen  ' this runs only if CONTINUE is used in QB interpreter?
                        CALL timehandler(0)

END SELECT
END IF

IF (show = false) THEN
' update interesting variables on screen/menu
' need to use fixed length strings to overwrite old properly
        COLOR 1, 3
```

```
                LOCATE 8, 28
                PRINT LTRIM$(UserIDstr$) ' Number of incalls in FXCHK.RPT activity log header
                LOCATE 9, 27
                PRINT STR$(NumberOfRecs%) ' Peak pending test reports in FXCHK3.RPT
                LOCATE 10, 27
                PRINT OutFaxLoad% ' Number of records in use in FXCHK3.RPT = pending outcalls
                LOCATE 11, 27
                PRINT RecdFaxes%
                LOCATE 13, 28
                PRINT LT$(LTRIM$(SA$), 4)     ' Rec'd Error Status LOCATE 8, 61
                PRT RecdTimeDate$, 20
                LOCATE 9, 61
                PRT RIGHT$(CSIDt1$, 20), 20
                LOCATE 10, 61
                PRT PhoneNoIn$, 20
                LOCATE 11, 61
                PRT UserCmd$, 20
                LOCATE 12, 61

IF LEN(PIN$) <= 12 THEN
                        PRT PIN$, 20
                ELSE
                        PRT LEFT$(PIN$, 11) + "+", 20
                END IF

LOCATE 13, 61
                PRT STR$(ES%), 20  ' Sent error status

' Update menu variables
                COLOR 15, 1
                ' LOCATE 15, 68
                ' IF test THEN PRINT "ON ";  ELSE PRINT "OFF";
                LOCATE 16, 68
                IF speed > 1 THEN PRINT "SLOW";  ELSE PRINT "FAST";
                LOCATE 17, 68
                IF faxprint THEN PRINT "ON "; ELSE PRINT "OFF";
                COLOR 11, 1
END IF
RESET COLOR 4, 3: LOCATE 24, 9
PRINT "Polling for received or sent fax traffic                    ";
COLOR 11, 1
'**** Get received fax record & report in FXCHK1.LOG, purge Q *****
' SHELL > NUL screws up screen if cursor is on 25th line, so move it up:
LOCATE 24, 1
SHELL "LOADHI GCL FXCHK1.CMD > NUL"
logfile$ = "FXCHK1.LOG"
PASS = 0 recd$ = ""
OPEN "I", #1, logfile$
IF PASS = false THEN GOSUB SendFax

' On every 10th pass look for another pending, non-busy record to delete
IF (DelPendPhone$ <> "") AND (Column% = 80) THEN
                OffSet% = 237 ' number of bytes offset into FXCHK4.CMD where @PH starts
                ' patch command file with phone number to look for
                OPEN "FXCHK4.CMD" FOR BINARY AS #5
                SEEK #5, OffSet%
                FXCHK4$ = INPUT$(7, #5)
                IF FXCHK4$ = "@PH == " THEN
                        ' write variable length phone number + " in fixed 18 char field
                        PutStr$ = LT$(DelPendPhone$ + CHR$(34), 18)
                        PUT #5, OffSet% + 8, PutStr$
                        CLOSE #5

COLOR 4, 3: LOCATE 24, 9
                        PRINT "Searching for and deleting pending faxes            ";
                        COLOR 11, 1
                        LOCATE 24, 1
                        ' create FXCHK2.LOG and delete a pending record matching phone no.
                        ' If no such record left, then FXCHK2.LOG has a line GCL>Current status: 9999
                        SHELL "LOADHI GCL FXCHK4.CMD > NUL"
                ELSE
                        CLOSE #5
                        LOCATE 25, 1
                        PRINT "FXCHK4.CMD string @PH == not found, can't delete pending reports      ";
                END IF
        END IF ' SHELL > NUL screws up screen if cursor is on line 25, so move it up:
        LOCATE 24, 1
        SHELL "LOADHI GCL FXCHK3.CMD > NUL"
        LFILE2$ = "FXCHK2.LOG"
        PASS = 0
```

```
            OPEN "I", #1, LFILE2$
            IF PASS = false THEN
                    CLOSE #1
                    ' Append to transaction log FXCHK.RPT, mark FXCHK3.RPT rec as free
                    GOSUB Reports
            END IF
    LOOP
    STOP
    END ' Main loop '*********************************************************************
            '*** SendFax: IF CSID or DTMF phone no. ok, SEND A RETURN FAX       *
            '*********************************************************************
SendFax:
            'Read highest user no. from FXCHK.RPT header record
            'Create FXCHK.RPT if necessary and write header record
            PASS = 0
            OPEN "I", #5, "FXCHK.RPT"
            IF PASS THEN
                    GOSUB NewFXCHKrpt ' start new file and write header record, UserID%=1
            ELSE
                    INPUT #5, FXCHKBuf$
                    IF LEFT$(FXCHKBuf$, 9) = "FXCHK.RPT" THEN
                            ' Get highest used UserID from header record
                            UserID% = VAL(MID$(FXCHKBuf$, 63))
                            ' UserID% incremented even if TTI or phone no too short to dial
                            UserID% = UserID% + 1
                            CLOSE #5
                            ' Update Max.   in header record of FXCHK.RPT
                            OPEN "FXCHK.RPT" FOR BINARY AS #5
                            UserIDstr$ = RT$(STR$(UserID%), 7)
                            PUT #5, 63, UserIDstr$
                            CLOSE #5
                    ELSE
                            LOCATE 25, 1
                            PRINT "FXCHK.RPT has no valid header record, stopping!": STOP
                    END IF
            END IF ' Find unused record number or add a new record
            OPEN "FXCHK3.RPT" FOR RANDOM AS #4 LEN = LEN(Recdrec)
            NumberOfRecs% = LOF(4) / LEN(Recdrec)
            recno% = 1
            DO WHILE recno% <= NumberOfRecs%
                    GET #4, recno%, Recdrec
                    IF Recdrec.free THEN EXIT DO
                    recno% = recno% + 1
            LOOP
            ' Begin updating fields in temp call record
            Recdrec.free = false ' record will not be available CSIDt1$ = ""
            WHILE NOT EOF(1)
                    LINE INPUT #1, CSIDbuf$
                    ' alternate tbuf2$ has blank and box char at right stripped
                    lentbuf% = LEN(CSIDbuf$) - 2
                    IF lentbuf% < 0 THEN lentbuf% = 0
                    tbuf2$ = LEFT$(CSIDbuf$, lentbuf%)

' Extract DTMF string from User Id field in rec'd call record
                    ' avoid confusion with UserID%, which is an internal caller no. in sent record
                    IF LEFT$(CSIDbuf$, 7) = "User Id" THEN
                            ' If user entered any touchtones then "D=dtmf" is appended to User Id string
                            IF INSTR(CSIDbuf$, "=") = 0 THEN
                                    DTMFraw$ = ""
                            ELSE
                                    DTMFraw$ = MID$(CSIDbuf$, (INSTR(CSIDbuf$, "=") + 1))
                            END IF
                    END IF
                    IF LEFT$(tbuf2$, 8) = "Received" THEN
                            received$ = ""
                            ' look just past the colon for the variable length filename
                            ' trim leading blank characters
                            received$ = LTRIM$(MID$(CSIDbuf$, (INSTR(CSIDbuf$, ":") + 1)))
                            ' If transmission is interrupted just before test fax image,
                            ' then Gamma Dispatcher wrongly returns the filename of the
                            ' fax image received in the previous reception, even though
                            ' no such file exists. Therefor, check if file exists:
                            IF received$ <> "" THEN
                                    PASS = 0
                                    OPEN "I", #8, received$ IF PASS THEN
                                                    received$ = ""
                                    ELSE
                                                    CLOSE #8
                                    END IF
                            END IF
```

```
                            ' Recdrec.f2 = received$
            END IF

IF MID$(tbuf2$, 3, 16) = "Time and date we" THEN
                    RecdTimeDate$ = MID$(tbuf2$, 56)
                    IF RecdTimeDate$ = "" THEN RecdTimeDate$ = TIME$ + " " + DATE$
                    Recdrec.f3 = RecdTimeDate$
            END IF ' find Rec'd TTI (phone no.?) in rec'd log
            IF MID$(CSIDbuf$, 3, 15) = "Your answerback" THEN
                    CSIDt1$ = LTRIM$(MID$(tbuf2$, 30))
                    Recdrec.f4 = CSIDt1$
            END IF IF MID$(tbuf2$, 3, 4) = "Subm" THEN
                    Recdrec.f5 = MID$(tbuf2$, 56)
            END IF IF MID$(tbuf2$, 3, 10) = "The number" THEN
                    ItemsRecd% = VAL(MID$(tbuf2$, 68))
            END IF IF MID$(tbuf2$, 3, 14) = "Telephone line" THEN
                    LN$ = MID$(tbuf2$, 67)

' If LN$=0, FNLINENOISE would give Illegal Function Call ERR
                    IF VAL(LN$) = 0 THEN
                            LNdBm% = 0
                    ELSE
                            LNdBm% = FNLINENOISE(VAL(LN$)) + COdBloss
                    END IF
                    Recdrec.f6 = STR$(LNdBm%)
            END IF IF MID$(tbuf2$, 3, 15) = "Signal Strength" THEN
                    SS$ = MID$(tbuf2$, 67)
                    ' 0 is SS value returned by Gamma when no measurement is taken
                    IF VAL(SS$) = 0 THEN
                            SSdBm% = 0
                    ELSE
                            SSdBm% = FNSIGSTREN(VAL(SS$)) + COdBloss
                    END IF
                    Recdrec.f7 = STR$(SSdBm%)
            END IF IF MID$(tbuf2$, 3, 14) = "Signal Quality" THEN
                    Recdrec.f8 = MID$(tbuf2$, 65)
            END IF IF MID$(tbuf2$, 3, 12) = "Error Status" THEN
                    Recdrec.f9 = MID$(tbuf2$, 66)
            END IF ' Save filename of received fax for later deletion
            IF LEFT$(CSIDbuf$, 8) = "Received" THEN
                    ' When no fax sent, rec'd filename is null or wrong, so:
                    IF RIGHT$(CSIDbuf$, 4) = ".TIF" THEN
                            recd$ = RIGHT$(CSIDbuf$, 12)
                            ' If no file was received, Gamma Dispatcher wrongly returns
                            ' the file name of last recd file. But this test is incomplete.
                            ' If there is a pending outgoing fax that will send a copy of a
                            ' recent fax, then the incorrect filename will refer to an existing
                            ' file. So a later test of Items Recd is used. Delete next test?
                            PASS = 0
                            OPEN "I", #8, recd$
                            IF PASS THEN
                                    recd$ = ""
                            ELSE
                                    CLOSE #8
                            END IF
                            ' If there are multiple pages, must kill them all
                            IF recd$ <> "" THEN
                                    MID$(recd$, 6) = "???"
                                    ' Record received call to on-screen activity array, callminutes%
                                    ' Initial letter of fax filename corresponds to board--
                                    ' convert it to callminutes% array index
                                    board% = ASC(LEFT$(recd$, 1)) - ASC("a")
                                    callminutes%(board%, minute%) = callminutes%(board%, minute%) + 1
                                    Recdrec.f2 = STR$(board%)
                            END IF ELSE
                            recd$ = ""
                    END IF
            END IF
WEND
CLOSE #1
' If user enters a command but does not send file, Q rec contains the
```

```
                ' the name of the last recd file, which would be wrongly deleted by code for
                ' each command. If Items Received is 0, however, we know filename is
                ' wrong. Test should go earlier, but we don't have ItemsRecd% yet.
                IF ItemsRecd% = 0 THEN recd$ = ""

'Parse DTMF string
                UserCmd$ = ""
                PhoneNoIn$ = ""
                PIN$ = ""

IF DTMFraw$ <> "" THEN

' strip #s, the touchtone termination character and blanks
                ' This is only temporary, because # is not terminating
                ' the string.  Should only have to strip one final #.
                ' Could simplify this when the software is fixed.
                ' Gamma software returns name of file containing touchtones
                ' instead of the touchtone chars if more than 24
                ' are entered.  This will result in Phone No too short handling which is ok
                DTMFin$ = ""
                FOR i% = 1 TO LEN(DTMFraw$)
                    DD$ = MID$(DTMFraw$, i%, 1)
                    IF DD$ <> "#" THEN DTMFin$ = DTMFin$ + DD$
                NEXT
                ' For some incompleted calls, DTMFraw$ has 5 trailing blanks.
                ' Maybe this will be fixed in a future release.
                DTMFin$ = RTRIM$(DTMFin$)

' Parse DTMF string into other strings
                ' using * as separator.  Distinguish strings
                ' by their length.  If user makes a mistake, they can press
                ' * and rekey all digits of any value in the string and it will
                ' replace the previously keyed value.

tones$ = ""
                DTMFposn% = 1
                DO
                        StarPosn% = INSTR(DTMFposn%, DTMFin$, "*")
                        ' end of string case
                        IF StarPosn% = 0 THEN StarPosn% = LEN(DTMFin$) + 1
                        tones$ = MID$(DTMFin$, DTMFposn%, (StarPosn% - DTMFposn%))
                        SELECT CASE LEN(tones$)
                                CASE 1 TO 2
                                    UserCmd$ = tones$
                                CASE 3 TO 11
                                    PhoneNoIn$ = tones$
                                CASE IS > 11
                                    PIN$ = tones$
                        END SELECT
                        DTMFposn% = StarPosn% + 1
                LOOP UNTIL DTMFposn% > LEN(DTMFin$)
END IF ' Strip any leading 1 digit (why not strip down to 10 digits?)
IF LEFT$(PhoneNoIn$, 1) = "1" THEN PhoneNoIn$ = MID$(PhoneNoIn$, 2)
' If local user forgot to DTMF area code, add it back for puposes of
' comparison with CSID only.
IF LEN(PhoneNoIn$) = 7 THEN PhoneNoIn$ = AreaCode$ + PhoneNoIn$ Recdrec.f10 = PhoneNoIn$
Recdrec.f11 = UserCmd$
Recdrec.f12 = PIN$ ' If Print toggle is on and system is not sending back received faxes,
' then print the fax now:
IF received$ <> "" THEN
        IF FaxBack% = false THEN
                'Print the fax: Graceful exit, all pages, LaserJet 300x300, width scaling
                'Need GCL error-handler for printer unavailable
                IF faxprint = true THEN
                        FAXP$ = "LOADHI FAXP -G1 -P1 -M10 -X1 " + received$
                        SCREEN , , 1    ' can't suppress FAXP output with > NUL
                        ' shell "FAXM" could add header with CSID here
                        SHELL FAXP$
                        SCREEN , , 0    ' restore default screen
                END IF
                IF UserCmd$ <> "88" THEN KILL recd$
        END IF
END IF ' collapse any non-numeric chars in CSID
CSIDt2$ = ""
FOR i% = 1 TO LEN(CSIDt1$)
   DD$ = MID$(CSIDt1$, i%, 1)
   IF ASC(DD$) > 47 AND ASC(DD$) < 58 THEN CSIDt2$ = CSIDt2$ + DD$
NEXT
```

```
CSIDt2$ = RIGHT$(CSIDt2$, 10)
Phone2Dial$ = CSIDt2$

' If user touchtoned his phone number, use it instead of TTI for
' sending any return fax
IF PhoneNoIn$ <> "" THEN Phone2Dial$ = PhoneNoIn$ '* if caller is from AreaCode$, don't dial prefix or area code   **
DialPre$ = dialprelong$
IF LEFT$(Phone2Dial$, 3) = AreaCode$ THEN  ' fails if AreaCode$ = ""
    Phone2Dial$ = MID$(Phone2Dial$, 4)     ' strip area code
    ' When dialing a local number no prefix (e.g. "1") needed before area code
    DialPre$ = ""
ELSE
    ' If local call, no prefix
    IF LEN(Phone2Dial$) = 7 THEN DialPre$ = ""
END IF IF LEN(Phone2Dial$) < (10 - LEN(AreaCode$)) THEN
        LOCATE 25, 1
        PRINT "TTI or DTMF Phone No too short to dial                          ";
        ' update time, date display on screen
        RecdTimeDate$ = TIME$ + " " + DATE$
        ' Bug: if very 1st call after INIT is TTI too short, file is created w/o header rec!

' IF TTI or DTMF Phone No. missing or too short to dial
        ' "8" is corresponding pseudo-User-command to appear in FXCHK.RPT
        CALL ReportRecord("8")
        KILL logfile$
        IF recd$ <> "" THEN KILL recd$
        Recdrec.free = true ' this record can be used since call aborted
ELSE
        ' erase previous message on bottom line
        LOCATE 25, 1
        COLOR 7, 0
        PRINT "                                                                ";

IF LEN(PIN$) > 12 THEN
                UserCmd$ = "P"  ' send bad pin fax
                PIN$ = LEFT$(PIN$, 11) + "+"  ' store truncated version for reporting
        END IF GLOG$ = "FXCHK1.LOG"  ' Log of received fax
        OPEN "I", #2, GLOG$   ' alias LOGFILE$ ' Open CMD file for sending a fax
        G2CMD$ = "FXCHK2.CMD"
        OPEN "O", #3, G2CMD$
        ' find usable OUTDOC$ file name to receive test report text ****
        GOSUB OutDocName
        OutText$ = ""
        ' Mark documents R/O with ATTRIB +R filename or they get deleted
        Document$ = ""
        Document2$ = ""
        Document3$ = ""
        Document4$ = ""
        Document5$ = ""
        Document6$ = ""
        SELECT CASE UserCmd$ CASE "", "0"  ' Standard test report or download FXCHK.RPT
                            COLOR 4, 3: LOCATE 24, 9
                            IF PIN$ = ReportPIN$ THEN
                                    ' download FXCHK.RPT to a GammaFax board
                                    PRINT "Sending FXCHK.RPT to caller's GammaFax board        ";
                                    COLOR 11, 1
                                    KILL "FXCHK.RPB"
                                    NAME "FXCHK.RPT" AS "FXCHK.RPB"
                                    GOSUB NewFXCHKrpt 'create new file, header rec
                                    UserID% = 0
                                    ' call rec may wrongly contain old received filename
                                    received$ = ""
                                    GOSUB StdSendFax
                            ELSE
                                    PRINT "Building test report                               ";
                                    COLOR 11, 1
                                    GOSUB header
                                    ' Create OUTDOC$ and script FXCHK2.CMD to send it
                                    GOSUB TestReport
                                    GOSUB StdSendFax
                            END IF CASE "2"  ' Delete all pending test reports for TTI or DTMF phone no.
                            ' This routine has the limitation that if the user has more than 1
                            ' pending report and another user also requests to delete pending
                            ' reports then not all of the first caller's reports will be deleted.
                            ' Enhancement: track multiple caller's phone nos in array or random file
                            COLOR 4, 3: LOCATE 24, 9
                            DelPendPhone$ = OutsideLine$ + DialPre$ + Phone2Dial$ + AcctCode$
```

```
                        PRINT "Deleting pending reports for phone: " + DelPendPhone$ + "         ";
                        COLOR 11, 1

' Write call record to FXCHK.RPT, rec'd measures only, for User command "2"
                        CALL ReportRecord(UserCmd$)
                        CLOSE #3  ' G2CMD$ command file won't be needed
                        KILL G2CMD$
                        CLOSE #2  ' logfile$
                        KILL logfile$
                        IF recd$ <> "" THEN KILL recd$
                        Recdrec.free = true CASE "88"  ' Receive and store non-test fax
                        ' Must rename or move received files after each use or
                        ' next use will give an error message.  Enhance by finding
                        ' a unique filename for new files.
                        ' Dangerous, could fill the disk.  Would like to check
                        ' on free disk space and refuse to receive if too little,
                        ' advising sender by fax that nothing will be kept.

' Don't send or do anything with the fax
                        COLOR 4, 3: LOCATE 24, 9
                        PRINT "Received non-test fax                            ";
                        COLOR 11, 1
                        ' Maybe it's already open
                        ' Write call record for FXCHK.RPT, rec'd measures only, command "88"
                        ' for received and stored faxes
                        CALL ReportRecord(UserCmd$)
                        ' rename received non-test faxes so COPY can find and KILL can't
                        IF recd$ <> "" THEN
                                recdQ$ = recd$
                                MID$(recdQ$, 5) = "Q"
                                SCREEN , , 1    ' can't suppress RENAME output with > NUL
                                SHELL "RENAME " + recd$ + " " + recdQ$
                                SCREEN , , 0    ' restore default screen
                                ' counter for screen display
                                RecdFaxes% = RecdFaxes% + 1
                        END IF
                        CLOSE #2  ' logfile
                        KILL logfile$
                        ' Since this call will not be returned, the temp record
                        ' would never be reset to free.
                        Recdrec.free = true CASE "P"  ' Bad PIN number
                        COLOR 4, 3: LOCATE 24, 9
                        PRINT "Building bad PIN fax                             ";
                        COLOR 11, 1
                        GOSUB header
                        ' received record could contain wrong old recd filename
                        received$ = ""
                        OutText$ = "BADPIN.DOC"
                        GOSUB StdSendFax CASE ELSE  ' User DTMF'd an invalid command, send error msg fax
                        COLOR 4, 3: LOCATE 24, 9
                        PRINT "Building bad user command fax                    ";
                        COLOR 11, 1
                        GOSUB header
                        ' received record could contain wrong old recd filename received$ = ""
                                OutText$ = "BADCMD.DOC"
                                GOSUB StdSendFax
                END SELECT END IF
        ' Complete writing the temp call log record, whether free or not
        ' The DTMF variables are not direct from the logfile like the other
        ' fields, but parsed from the User Id field.
        Recdrec.f1 = STR$(UserID%)
        ' Recdrec.f10 = PhoneNoIn$
        ' Recdrec.f11 = UserCmd$
        ' Recdrec.f12 = PIN$
        PUT #4, recno%, Recdrec
        CLOSE #4
        RETURN
        END ' subroutine SendFax '*****************************************************************
'*** NewFXCHKrpt: Start new file, write header, UserID% = 1     *
'*****************************************************************

NewFXCHKrpt:
        ' Create new file:
        OPEN "O", #5, "FXCHK.RPT"
        NewHeader$ = "FXCHK.RPT Started " + DATE$ + " " + TIME$ + "--Highest User No:       "
        UserID% = 1
```

```
' Write header record
' Enclose header in quotes (q$) to make spreadsheet import work
PRINT #5, Q$ + NewHeader$ + RT$(STR$(UserID%), 7) + Q$
CLOSE #5
RETURN
END ' Subroutine NewFXCHKrpt '*******************************************************************
'*** OutDocName:  CREATE SEQ. FILENAME FOR OUTDOC$ TEST REPORT    *
'*******************************************************************

OutDocName:
        PREFN$ = "FXCHK"
        SUFFN$ = ".TXT"
        EXIST = true
        EXT = 0
        WHILE EXIST
                EXT = EXT + 1
                SEXT$ = STR$(EXT)
                temp$ = PREFN$ + MID$(SEXT$, 2)
                OUTDOC$ = temp$ + SUFFN$ '* error handling if FXCHKnn.TXT already exists         **
                PASS = 0
                OPEN "I", #1, OUTDOC$
                CLOSE #1
                IF PASS THEN EXIST = false
        WEND
        RETURN
        END ' subroutine OutDocName '*******************************************************************
'*** TestReport:  CREATE OUTDOC$ TEST REPORT                      *
'*******************************************************************

TestReport:
        PRINT #1, " "
        PRINT #1, "Our facsimile diagnostic system recently received your test fax. Your"
        PRINT #1, "transmission was analyzed automatically and the results are given below."
        PRINT #1, "See the FaxChek instructions for help in interpreting these results."
        IF FaxBack% = true THEN
                PRINT #1, "The last page of this report is a copy of your original test fax that"
                PRINT #1, "you can visually examine for defects. Thanks for using the FaxChek system."
        ELSE
                PRINT #1, "The FaxChek system could not send back a copy of your original test fax."
                PRINT #1, "This does not indicate a problem with your machine. Thanks for using FaxChek."
        END IF PRINT #1, " "
    lines% = lines% + 7

'*** First extract variables for received measurements from FXCHK1.LOG*
    '*** Write paragraphs to OUTDOC depending on received measurements.*
    '*** Again read each line from FXCHK1.LOG received test fax data ****
    '*** and write to OUTDOC$ or FXCHK1.LOG or both              ****

LN$ = "": MS$ = "": SQ$ = "": SS$ = "": SA$ = ""
    IR$ = "": CR$ = "": DU$ = "": RL$ = "": RN$ = ""

WHILE NOT EOF(2)
        CALL CheckTime
        LINE INPUT #2, tbuf$
        ' alternate line--strip last two chars which are part of box
        lentbuf% = LEN(tbuf$) - 2
        IF lentbuf% < 0 THEN lentbuf% = 0
        tbuf2$ = LEFT$(tbuf$, lentbuf%)
        IF MID$(tbuf$, 3, 14) = "Telephone line" THEN
                        LN$ = RIGHT$(tbuf2$, 4)
                        ' If LN$=0, FNLINENOISE would give Illegal Function Call ERR
                        IF LN$ = "   0" THEN
                                LNdBm% = 0
                        ELSE
                                LNdBm% = FNLINENOISE(VAL(LN$)) + COdBloss
                        END IF
        END IF
        IF MID$(tbuf$, 3, 18) = "Your fax machine's" THEN MS$ = RIGHT$(tbuf2$, 4)
        IF MID$(tbuf$, 3, 14) = "Signal Quality" THEN SQ = VAL(RIGHT$(tbuf2$, 5))
        IF MID$(tbuf$, 3, 15) = "Signal Strength" THEN
                        SS$ = RIGHT$(tbuf2$, 5)
                        ' 0 is SS value returned by Gamma when no measurement is taken
                        IF SS$ = "   0" THEN
                                SSdBm% = 0
                        ELSE
                                SSdBm% = FNSIGSTREN(VAL(SS$)) + COdBloss
                        END IF
        END IF
        SNdBm% = SSdBm% - LNdBm% ' Signal to Noise Ratio
        IF MID$(tbuf$, 3, 12) = "Error Status" THEN SA$ = RIGHT$(tbuf2$, 4)
        IF MID$(tbuf$, 3, 13) = "The number of" THEN IR$ = RIGHT$(tbuf2$, 2)
```

```
            IF MID$(tbuf$, 3, 14) = "Previous times" THEN CR$ = RIGHT$(tbuf2$, 3)
            IF MID$(tbuf$, 3, 12) = "Connect time" THEN DU$ = RIGHT$(tbuf2$, 5)
            IF MID$(tbuf$, 3, 12) = "Non-standard" THEN RL$ = RIGHT$(tbuf2$, 3)
            IF MID$(tbuf$, 3, 10) = "Content of" THEN RN$ = MID$(tbuf2$, 3, 40)
WEND
CLOSE #2

' Add selected paragraphs to test report, based on rec'd measures
problem = false   ' flag for default "no problem" paragraph ' If PhoneNoIn$ is empty then rec'd TTI will be used for dialing and if
' the report reaches the user, the TTI must have been correct.
IF PhoneNoIn$ = "" OR CSIDt2$ = PhoneNoIn$ THEN
            PRINT #1, "Your answerback (`CSID,' `TTI') is correctly set to your fax phone number."
            PRINT #1, " "
            lines% = lines% + 2
ELSE
        problem = true
        IF CSIDt1$ <> "" THEN
            PRINT #1, "Your answerback, also called `CSID' or `TTI', is set to `"; CSIDt1$; "'."
            PRINT #1, "It does not contain the fax phone number, "; PhoneFmtd$; ", to which this report"
            PRINT #1, "was delivered. Having a correct answerback allows people sending you faxes to"
            PRINT #1, "know they have reached the right fax machine and to maintain correct activity"
            PRINT #1, "logs. We suggest you update your answerback following the directions in your"
            PRINT #1, "fax machine's manual. Then check it by calling the FaxChek system again"
            PRINT #1, "Ignore this paragraph if you requested that this test report be sent to a fax"
            PRINT #1, "machine different than the one you called from."
            PRINT #1, " "
            lines% = lines% + 9

ELSE ' CSID is null, empty
            PRINT #1, "Your answerback, sometimes called `CSID' or `TTI', is empty, or the call"
            PRINT #1, "was abnormally terminated in the first few seconds. If your answerback"
            PRINT #1, "is empty, we suggest you enter it following the directions in your fax"
            PRINT #1, "machine owner's manual. Having a correct answerback allows people sending"
            PRINT #1, "you faxes to know they have reached the right fax machine and maintain"
            PRINT #1, "correct activity logs."
            PRINT #1, " "
            lines% = lines% + 7
        END IF
END IF IF LNdBm% >= -48 THEN problem = true
SELECT CASE LNdBm%

CASE IS < -63
            PRINT #1, "Your line noise of "; LNdBm%; "dBm was extremely quiet, which is excellent."
            PRINT #1, ""
            lines% = lines% + 2

CASE -63 TO -58
            PRINT #1, "Your line noise of "; LNdBm%; "dBm was very quiet, which is good."
            PRINT #1, ""
            lines% = lines% + 2

CASE -58 TO -53
            PRINT #1, "Your line noise of "; LNdBm%; "dBm was quiet, which is good."
            PRINT #1, ""
            lines% = lines% + 2

CASE -53 TO -48
            PRINT #1, "Your line noise of "; LNdBm%; "dBm was acceptable."
            PRINT #1, ""
            lines% = lines% + 2

CASE -48 TO -43
            PRINT #1, "Your line noise of "; LNdBm%; " was noisy. Line noise is static or hiss on the"
            PRINT #1, "line that you sometimes hear on voice calls. This is a phone network problem."
            PRINT #1, "from either the local or long distance carrier that can result in poor fax"
            PRINT #1, "image quality or erratic operation. If the problem recurs, you may"
            PRINT #1, "wish to ask your local phone company for a more detailed line noise test."
            PRINT #1, ""
            lines% = lines% + 6

CASE IS >= 43
            PRINT #1, "Your line noise of "; LNdBm%; "was unusable. Line noise is static or hiss on"
            PRINT #1, "the line that you sometimes hear on voice calls. This is a phone network"
            PRINT #1, "problem with either the local or long distance carriers. It can result in poor"
            PRINT #1, "fax image quality or erratic operation. If the problem recurs, you may wish to"
            PRINT #1, "ask your local phone company for a more extensive line noise test."
            PRINT #1, ""
            lines% = lines% + 6

END SELECT

' Under some conditions, Signal Strength is reported as 0, but actually
' no reading was taken. Don't report wrong paragraphs in that case.
IF SS$ <> "    0" THEN
        IF (SSdBm% <= -37) OR (SSdBm% > -17) THEN problem = true
        SELECT CASE SSdBm%
```

```
            CASE IS > -17
                PRINT #1, "Your signal strength of "; SSdBm%; "dBm may be too strong for some fax machines."
                PRINT #1, "Your fax machine serviceperson can reduce it."
                PRINT #1, ""
                lines% = lines% + 3

CASE -22 TO -17
                PRINT #1, "Your signal strength of "; SSdBm%; "dBm was stronger than ideal. If"
                PRINT #1, "your machine is serviced for other reasons, you should have it checked."
                PRINT #1, ""
                lines% = lines% + 3

CASE -27 TO -22
                PRINT #1, "Your signal strength of "; SSdBm%; "dBm was good."
                PRINT #1, ""
                lines% = lines% + 2

CASE -32 TO -27
                PRINT #1, "Your signal strength of "; SSdBm%; "dBm was acceptable."
                PRINT #1, ""
                lines% = lines% + 2

CASE -37 TO -32
                PRINT #1, "Your signal strength of "; SSdBm%; "dBm was weak. This might result"
                PRINT #1, "in poor image, unreliability or inability to connect with certain"
                PRINT #1, "other fax machines, particularly on international calls. Your fax"
                PRINT #1, "machine serviceperson can usually make an adjustment to correct"
                PRINT #1, "this problem. Sometimes repairs to your local phone service are"
                PRINT #1, "necessary as well."
                PRINT #1, ""
                lines% = lines% + 7

CASE IS <= -37
                PRINT #1, "Your signal strength of "; SSdBm%; "dBm was marginal. This often results"
                PRINT #1, "in poor image, unreliability or inability to connect with certain"
                PRINT #1, "other fax machines, particularly on international calls. Your fax"
                PRINT #1, "machine serviceperson can usually make an adjustment to correct"
                PRINT #1, "this problem. Sometimes repairs to your local phone service are"
                PRINT #1, "necessary as well."
                PRINT #1, ""
                lines% = lines% + 7

END SELECT
END IF

IF SNdBm% < 30 THEN problem = true
SELECT CASE SNdBm%

CASE IS < 25
        PRINT #1, "Your signal to noise ratio of "; SNdBm%; " is poor. This means that your fax"
        PRINT #1, "signal was not sufficiently louder than the background phone line noise."
        PRINT #1, "This problem often results in erratic communications and legibility problems."
        PRINT #1, "Ask your local phone company for a phone line test. Sometimes your fax"
        PRINT #1, "service person can compensate for this condition by making a signal strength"
        PRINT #1, "adjustment to your fax machine."
        PRINT #1, ""
        lines% = lines% + 6

CASE 25 TO 29
        PRINT #1, "Your signal to noise ratio of "; SNdBm%; " is marginal. Your fax signal was"
        PRINT #1, "only moderately louder than the background phone line noise."
        PRINT #1, "If this measurement becomes worse, it can result in erratic communications"
        PRINT #1, "and legibility problems. Your local phone company can determine whether"
        PRINT #1, "improvements can be made. Sometimes your fax service person can compensate"
        PRINT #1, "for this condition by making a signal strength adjustment to your fax machine."
        PRINT #1, ""
        lines% = lines% + 7

END SELECT

IF SA$ <> "   0" THEN problem = true
' should only select case below if SA$ <> 0 and use a CASE ELSE clause as catch-all
SELECT CASE SA$ CASE "3200", "3220", "3260"
        PRINT #1, "No DIS (Digital Identification Signal) was received from your fax machine."
        PRINT #1, "The call may have been interrupted, or your fax machine may have an"
        PRINT #1, "electronic problem. Try sending again to see if the problem is repeated."
        PRINT #1, "If the problem recurs, call your fax machine serviceperson."
        PRINT #1, ""
        lines% = lines% + 5

CASE "3204", "3213"
        PRINT #1, "The quality of the phone connection was too poor to continue (as measured during"
        PRINT #1, "modem training.) This phone problem is more likely to be with your local phone"
        PRINT #1, "company than your long distance carrier. As a next step you may wish to call"
        PRINT #1, "611 or another number for your local phone company and request a line test."
        PRINT #1, "If no problems are found you may wish to re-test or call your long distance"
        PRINT #1, "carrier."
```

```
            PRINT #1, ""
            lines% = lines% + 7

CASE "3914", "3915", "3205"
            PRINT #1, "The quality of the phone connection was too poor to continue (as measured during"
            PRINT #1, "modem training.) This phone problem is more likely to be with your local phone"
            PRINT #1, "company than your long distance carrier. As a next step you may wish to call"
            PRINT #1, "611 or another number for your local phone company and request a line test."
            PRINT #1, "If no problems are found you may wish to re-test or call your long distance"
            PRINT #1, "carrier."
            PRINT #1, ""
            lines% = lines% + 7

CASE "3913"
            PRINT #1, "The fax signal was lost during the transmission of your test fax page. This"
            PRINT #1, "usually happens because the phone connection is lost. If the problem recurs"
            PRINT #1, "at the same point in further tests, however, the problem probably lies with"
            PRINT #1, "the fax machine and you should call for service on it. Otherwise the"
            PRINT #1, "problem lies with erratic phone connections by the local or long distance"
            PRINT #1, "carrier. Once the problem is corrected, your test fax will accompany this"
            PRINT #1, "test report."
            PRINT #1, ""
            lines% = lines% + 8

CASE "3916", "3917", "3918", "3920", "3206", "3210", "3211", "3215", "3218", "3231", "3241", "3242"
            PRINT #1, "There was a failure during handshaking or other protocol exchanges."
            PRINT #1, "If the problem recurs at the same point on subsequent tests, call your"
            PRINT #1, "your fax serviceperson for further testing, otherwise call your local"
            PRINT #1, "phone company."
            PRINT #1, ""
            lines% = lines% + 5

CASE "3202", "3212", "3214", "3223", "3230", "3240"
            PRINT #1, "Your test fax tranmission was interrupted when your fax machine sent a"
            PRINT #1, "signal to disconnect (DCN.) If the problem recurs at the same point on"
            PRINT #1, "subsequent tests, call your fax serviceperson for further testing, otherwise"
            PRINT #1, "call your local phone company."
            PRINT #1, ""
            lines% = lines% + 5

CASE "3204", "3213"
            PRINT #1, "It was not possible to adapt to the phone lines used in your transmission."
            PRINT #1, "(Modem training failed.) If the problem recurs with a second FaxChek test,"
            PRINT #1, "ask your local phone company for a phone line test."
            PRINT #1, ""
            lines% = lines% + 4

CASE "3250" TO "3251"
            PRINT #1, "A large number of scan lines in your test fax image had errors. You will"
            PRINT #1, "probably see the degradation in the copy of your test fax on the following page."
            PRINT #1, "If the problem recurs in subsequent tests, ask your local phone company for a"
            PRINT #1, "line test."
            PRINT #1, ""
            lines% = lines% + 5

CASE "3222", "3243", "3267"
            PRINT #1, "Your fax machine sent a signal (PIN) indicating that it could not interpret a"
            PRINT #1, "message sent to it by the FaxChek system and the transmission had to be cut short."
            PRINT #1, "One possible cause is intermittent phone line problems. Try another test. If it"
            PRINT #1, "also reveals phone line problems, request a line test from your local phone"
            PRINT #1, "company."
            PRINT #1, ""
            lines% = lines% + 6

CASE "3225", "3245", "3269"
            PRINT #1, "In response to a message from the FaxChek system, your fax machine sent a response"
            PRINT #1, "that could not be recognized. One possible cause is intermittent phone line"
            PRINT #1, "problems. Try another test. If it also reveals phone line problem, request a"
            PRINT #1, "line test from your local phone company."
            PRINT #1, ""
            lines% = lines% + 5

CASE "3224", "3244", "3268"
            PRINT #1, "A (handshake) response was expected from your fax machine, but not received"
            PRINT #1, "during the time allowed. This can happen if your transmission is interrupted"
            PRINT #1, "by a phone line or power failure. If the problem recurs at the same point"
            PRINT #1, "subsequent tests, call your fax serviceperson for further testing, otherwise"
            PRINT #1, "call your local phone company."
            PRINT #1, ""
            lines% = lines% + 6
END SELECT

SELECT CASE MS$

CASE "9600"
                    SQMARGINAL = 2048
            CASE "7200"
                    SQMARGINAL = 4352
            CASE "4800"
```

```
                    SQMARGINAL = 3328
        CASE "2400"
                    SQMARGINAL = 18944

END SELECT

IF SQ > SQMARGINAL THEN
            PRINT #1, "Your signal quality of "; SQ; "was marginal, given your transmission"
            PRINT #1, "speed of "; MS$; ". This is usually caused by telephone line noise or"
            PRINT #1, "distortion problems.  Related symptoms are often poor image quality or"
            PRINT #1, "incomplete transmissions.  Try another test to see if any telephone"
            PRINT #1, "line problems clear up.  If not, ask your local phone company to do a"
            PRINT #1, "line test.  Occasionally, electronics in the fax machine cause this"
            PRINT #1, "problem."
            PRINT #1, ""
            lines% = lines% + 8
END IF ' For some incomplete calls, Q Mgr. returns MS$ = 0.  Don't print paragraph in that case.
IF VAL(MS$) < 9600 AND VAL(MS$) > 1 THEN
            PRINT #1, "Your transmission speed of "; MS$; " was less than the top speed of 9600 bits per"
            PRINT #1, "second that most modern Group III fax machines use.  Machines that are several"
            PRINT #1, "years old and inexpensive PC fax boards may be limited to a lower speed.  Your"
            PRINT #1, "speed may have automatically stepped downward during transmission to compensate"
            PRINT #1, "for telephone line problems.  It takes longer to send and receive fax messages"
            PRINT #1, "at less than 9600 b/s and telephone charges will be higher.  Check your owner's"
            PRINT #1, "manual to determine the maximum speed for your machine and whether it has been"
            PRINT #1, "set up to use the maximum speed."
            PRINT #1, ""
            lines% = lines% + 9
END IF

SELECT CASE VAL(IR$)

CASE IS > 1
            PRINT #1, "We received "; IR$; " pages in your test fax.  Only one page is used"
            PRINT #1, "in our analysis.  Please send just one page in future tests."
            PRINT #1, ""
            lines% = lines% + 3
     CASE 0
            PRINT #1, "Although we received your fax transmission, no test fax page was received."
            PRINT #1, "Possible causes are that no page was in your fax machine's document feeder"
            PRINT #1, "a misfeed occurred, or a disconnection occurred prior page transmission."
            PRINT #1, "Try again to see if the problem recurs.  If it recurs at the same point each"
            PRINT #1, "test, call your fax serviceperson.  If the problem happens intermittantly, or"
            PRINT #1, "or a different times in the sending sequence, call for telephone service."
            PRINT #1, ""
            lines% = lines% + 7

END SELECT

IF problem = false THEN
            PRINT #1, "Our automatic analysis revealed no problems.  Your fax machine and local"
            PRINT #1, "phone service appear to be operating correctly.  However, you may discover"
            PRINT #1, "other problems by examining the image quality of this report as explained"
            PRINT #1, "in the user's instructions."
            PRINT #1, ""
            lines% = lines% + 5
END IF PRINT #1, "The technical measurements leading to the above conclusion(s) are listed below."
            PRINT #1, "If you experience fax communications problems, these measurements may be of"
            PRINT #1, "interest to your telephone company or fax machine serviceperson."
            lines% = lines% + 3

'table of measurements should fit on one page or the next and not be
    'broken up.  If it won't entirely fit on first page, fill rest of first
    'page with blank lines.
    IF lines% > 38 THEN
              FOR i% = 1 TO (64 - lines%)
                      PRINT #1, ""
              NEXT i%
         END IF WrtMeasures:
    OPEN "I", #2, GLOG$
    WHILE NOT EOF(2)
            CALL CheckTime
            LINE INPUT #2, tbuf$ ' alternate tbuf2$ has box chars at right stripped
            lentbuf% = LEN(tbuf$) - 2
            IF lentbuf% < 0 THEN lentbuf% = 0
            tbuf2$ = LEFT$(tbuf$, lentbuf%)

IF MID$(tbuf$, 3, 15) = "Your answerback" THEN PRINT #1, tbuf$

IF MID$(tbuf$, 3, 14) = "Telephone line" THEN
                    IF LNdBm% = 0 THEN
                            MID$(tbuf$, 65) = RT$("N/A", 8) + " ¹   "
```

```
                        ELSE
                                MID$(tbuf$, 65) = RT$(STR$(LNdBm%), 8) + " ± "
                        END IF
                        PRINT #1, tbuf$
                END IF IF MID$(tbuf$, 3, 18) = "Your fax machine's" THEN PRINT #1, tbuf$ IF MID$(tbuf$, 3, 14) = "Signal Quality" THEN
                        ' SQ is 0 if no fax received OR if it is really 0, so
                        ' must look at LNdBm% to see if SQ is valid or not available
                        IF LNdBm% = 0 THEN
                                MID$(tbuf$, 67) = RT$("N/A", 6) + " ± "
                        ELSE
                                MID$(tbuf$, 67) = RT$(STR$(SQ), 6) + " ± "
                        END IF
                        PRINT #1, tbuf$
                END IF IF MID$(tbuf$, 3, 15) = "Signal Strength" THEN
                        ' this line is not long enough for data
                        tbuf$ = tbuf$ + "    "
                        IF SSdBm% = 0 THEN
                                MID$(tbuf$, 65) = RT$("N/A", 8) + " ± "
                        ELSE
                                MID$(tbuf$, 65) = RT$(STR$(SSdBm%), 8) + " ± "
                        END IF
                        PRINT #1, tbuf$
                END IF IF MID$(tbuf$, 3, 15) = "Signal to noise" THEN
                        IF SSdBm% = 0 THEN ' if Signal Strength is 0, no measure available
                                MID$(tbuf$, 65) = RT$("N/A", 8) + " ± "
                        ELSE
                                MID$(tbuf$, 65) = RT$(STR$(SNdBm%), 8) + " ± "
                        END IF
                        PRINT #1, tbuf$
                END IF IF MID$(tbuf$, 3, 12) = "Error Status" THEN
                        MID$(tbuf$, 65) = RT$(SA$, 8) + " ± "
                        PRINT #1, tbuf$
                END IF IF MID$(tbuf$, 3, 16) = "Time and date we" THEN
                        RecdTimeDate$ = RIGHT$(tbuf2$, 17) ' save for screen display
                        PRINT #1, tbuf$
                END IF
                ' Recd time, date null when DTMF only
                IF RecdTimeDate$ = "" THEN RecdTimeDate$ = TIME$ + " " + DATE$ IF MID$(tbuf$, 3, 4) = "Subm" THEN
                        GOTO EndWrtMeasures
                END IF IF MID$(tbuf$, 3, 13) = "The number of" THEN PRINT #1, tbuf$
                IF MID$(tbuf$, 3, 14) = "Previous times" THEN PRINT #1, tbuf$
                IF MID$(tbuf$, 3, 17) = "Last error status" THEN PRINT #1, tbuf$
                IF MID$(tbuf$, 3, 12) = "Connect time" THEN PRINT #1, tbuf$
                IF MID$(tbuf$, 3, 12) = "Non-standard" THEN PRINT #1, tbuf$ 'IF MID$(tbuf$, 3, 10) = "Content of" THEN
                '    IF RIGHT$(tbuf2$, 5) = "     " THEN
                '        MID$(tbuf$, 67) = " None"
                '        PRINT #1, tbuf$
                '    ELSE
                '        nsfbuf$ = MID$(tbuf2$, 73) ' grab actual nsf from line
                '        ' blank out original line, move all text to following lines
                '        MID$(tbuf$, 67) = "   ±   "
                '        PRINT #1, tbuf$
                '        ' print as many lines of NSF as needed
                '        linepos% = 1
                '        DO
                '            nsfline$ = MID$(nsfbuf$, linepos%, 69)
                '            nsfline1$ = nsfline$ + SPACE$(70 - LEN(nsfline$))
                '            tbuf$ = "± " + nsfline1$ + " ±"
                '            PRINT #1, tbuf$
                '            linepos% = linepos% + 69
                '        LOOP UNTIL LEN(nsfline$) < 69
                '    END IF
                '    GOTO EndWrtMeasures
                'END IF IF LEFT$(tbuf$, 9) = "  FaxChek" THEN PRINT #1, tbuf$ IF MID$(tbuf$, 3, 12) = "TRANSMISSION" THEN PRINT #1, tbuf$
                IF MID$(tbuf$, 3, 13) = "YOUR TEST FAX" THEN PRINT #1, tbuf$
                IF MID$(tbuf$, 3, 20) = "TEST REPORT DELIVERY" THEN PRINT #1, tbuf$
                ' Include blank lines in report
                IF LEFT$(tbuf$, 1) = "" THEN PRINT #1, tbuf$
```

```
                ' Include extended ASCII box chars
                IF MID$(tbuf$, 3, 1) = "i" THEN PRINT #1, tbuf$
EndWrtMeasures:
    WEND RETURN
    END ' subroutine TestReport '***********************************************************************
    '*** Header: begin output fax, include logo and address block       *
    '*********************************************************************** header:
        lines% = 0 ' no of lines on test report page for simulated form feed ' generate formatted version of 7 digit or 10 digit phone number
        IF LEN(Phone2Dial$) = 10 THEN
                areacd$ = "(" + LEFT$(Phone2Dial$, 3) + ") "
                Phone7$ = RIGHT$(Phone2Dial$, 7)
        ELSE ' length 7
                areacd$ = ""
                Phone7$ = Phone2Dial$
        END IF
        PhoneFmtd$ = areacd$ + LEFT$(Phone7$, 3) + "-" + RIGHT$(Phone7$, 4)

OPEN "O", #1, OUTDOC$
        IF (test = false) THEN PRINT #1, "@/..\LOGO2.TIF@/"
        PRINT #1, "                              Please report suggestions and problems with"
        PRINT #1, "                              the FaxChek system by fax to (408) 395-4595"
        PRINT #1, "DATE:  " + DATE$
        PRINT #1, "TIME:  " + TIME$
        PRINT #1, "TO:    Fax Operator/User at "; PhoneFmtd$
        PRINT #1, "FROM:  FaxChek Diagnostic Center at "; SendCSID$
        lines% = lines% + 16 ' 10 for logo, 6 for text lines
        RETURN
        END ' subroutine Header '***********************************************************************
    '*** StdSendFax: include OutTest$, Document$, received$, Q up       *
    '***********************************************************************

StdSendFax:
        ' copy all of OutText$ document into OUTDOC$, right after header lines
        IF OutText$ <> "" THEN
                OPEN "i", #6, OutText$
                WHILE NOT EOF(6)
                    LINE INPUT #6, tbuf$
                    PRINT #1, tbuf$
                WEND
                CLOSE #6
        END IF
        ' submit to Q for sending for the first try only
        ' The USERID field of send records holds UserID%;Retries%
        PRINT #3, "USER "; STR$(UserID%); ";"; "0"     ' Retries% = 0 the 1st time
        IF PIN$ = ReportPIN$ THEN
                PRINT #3, "XFER 2"
                PRINT #3, "SEND FXCHK.RPB"
        ELSE
                ' all pages in a xmssion must be std or fine, or GFDCX.BIN has retraining
                ' bug with Sharp FO-6000 machine.
                ' no top mar, 2-line bot. margin, left 12 char, std. res., 66 line page length
                IF OUTDOC$ <> "" THEN PRINT #3, "SEND "; OUTDOC$; " -MT0 -MB1 -LM15 -VR0 -PL66"
                IF received$ <> "" THEN
                        IF FaxBack% = true THEN
                                PRINT #3, "SEND " + received$
                        END IF
                END IF
        END IF
        ' All pages in files numbered NAMED00n.TIF will be sent
        IF Document$ <> "" THEN PRINT #3, "SEND " + Document$ + " -MT2 -MB0 -VR1 -PL64"
        IF Document2$ <> "" THEN PRINT #3, "SEND " + Document2$ + " -MT0 -MB0 -VR1 -PL64"
        IF Document3$ <> "" THEN PRINT #3, "SEND " + Document3$ + " -MT0 -MB0 -VR1"
        IF Document4$ <> "" THEN PRINT #3, "SEND " + Document4$ + " -MT0 -MB0 -VR1"
        IF Document5$ <> "" THEN PRINT #3, "SEND " + Document5$ + " -MT0 -MB0 -VR1"
        IF Document6$ <> "" THEN PRINT #3, "SEND " + Document6$ + " -MT0 -MB0 -VR1"
        ' inbound only CP boards are marked with GFXSHUTDOWN in GFAX.$DC. All others outbound
        ' PRINT #3, "MODEMID GFAX1.1"  ' all calls go out on 1st POTS line, it's cheaper
        PRINT #3, "RETRY 0"   ' try to send this fax just once (was 24 times)
        PRINT #3, "CALLS 1"   ' try only once for each attempt
        PRINT #3, "CDTIME 60" ' wait for fax modem answer tone for 60 sec.
        PRINT #3, "STARTTIME +00:00:20"  ' make call min. 20 secs from now so caller's machine has recovered
        dial$ = "DIAL " + OutsideLine$ + DialPre$ + Phone2Dial$ + AcctCode$
        PRINT #3, dial$
        PRINT #3, "EXIT"

OutFaxLoad% = OutFaxLoad% + 1
        CLOSE #3  ' G2CMD$
```

```
        CLOSE #2    ' GLOG$
        CLOSE #1    ' OUTDOC$

' send completed fax to Q
        ' SHELL * > NUL screws up screen if cursor is on 25th line, so:
        LOCATE 24, 1
        SHELL "LOADHI GCL FXCHK2.CMD > NUL"
        KILL logfile$
        KILL "FXCHK2.CMD"

RETURN
        END  ' subroutine StdSendFax

'*******************************************************************
'*** Reports:  APPEND TO LOG FILES FXCHK.RPT, FXCHK1.RPT           *
'*******************************************************************

Reports:
        ES% = 0
        SFILE$ = ""
        LSSEND$ = ""
        PhoneNumber$ = ""
    USID1$ = ""
    Retries% = 24

OPEN "I", #1, LFILE2$ ' Sent measures
    OPEN "FXCHK3.RPT" FOR RANDOM AS #4 LEN = LEN(Recdrec)
    NumberOfRecs% = LOF(4) / LEN(Recdrec)
    ' Add transaction record (recd + sent) to end of FXCHK.RPT
    OPEN "FXCHK.RPT" FOR APPEND AS #5
    WHILE NOT EOF(1)
        LINE INPUT #1, tbuf2$
        IF LEFT$(tbuf2$, 24) = "GCL>Current status: 9999" THEN
                DelPendPhone$ = ""  ' don't try to find any more recs to delete
                COLOR 4, 3: LOCATE 24, 9
                PRINT "Completed deleting pending faxes                     "; : SLEEP 2
                COLOR 11, 1
        END IF IF LEFT$(tbuf2$, 5) = "Error" THEN ES% = VAL(MID$(tbuf2$, 14))
        IF LEFT$(tbuf2$, 4) = "Send" THEN
                SFILE$ = MID$(tbuf2$, 15)
                LSSEND$ = MID$(tbuf2$, 20)
        END IF
        IF LEFT$(tbuf2$, 5) = "Phone" THEN PhoneNumber$ = MID$(tbuf2$, 14)
        IF LEFT$(tbuf2$, 9) = "Completed" THEN CompleteTime$ = MID$(tbuf2$, 20)
        IF LEFT$(tbuf2$, 10) = "Submission" THEN SubmitTime$ = MID$(tbuf2$, 20)
        IF LEFT$(tbuf2$, 6) = "Length" THEN LenRecdNSF$ = MID$(tbuf2$, 24)
        IF LEFT$(tbuf2$, 12) = "Received NSF" THEN RecdNSF$ = MID$(tbuf2$, 17)

IF LEFT$(tbuf2$, 4) = "User" THEN
                ' Extract USID1 and Retries%
                UserPosn% = INSTR(tbuf2$, ";")
                USID1$ = MID$(tbuf2$, 9, (UserPosn% - 9))
                USID1 = VAL(USID1$)
                Retries% = VAL(MID$(tbuf2$, (UserPosn% + 1)))

'         success    Voice Resp.   Ringback      Ring, No ans   .LST missing  Tried enuf times
        IF ES% = 0 OR ES% = 3934 OR ES% = 3935 OR ES% = 3936 OR ES% = 3103 OR Retries% >= RetriesLimit% THEN
                ' above line use to have "OR ES% = 3224"
                COLOR 4, 3: LOCATE 24, 9
                PRINT "Adding to activity log                          ";
                COLOR 11, 1
                TERM = true
                recno% = 1
                DO WHILE (recno% <= NumberOfRecs%) AND (TERM = true)
                        GET #4, recno%, Recdrec
                        tbuf3$ = RTRIM$(Recdrec.f1)
                           USID2$ = tbuf3$
                           USID2 = VAL(USID2$)
                           IF USID1 = USID2 THEN
                                USID3 = USID1
                                ' Copy all lines from rec' measures to FXCHK.RPT
                                ' in comma delimited format for import to dBASE or spreadsheet
                                PRINT #5, USID2; ",";
                                PRINT #5, RTRIM$(Recdrec.f2); ",";             ' Board that rec'd call
                                PRINT #5, Q$; RTRIM$(Recdrec.f3); Q$; ",";     ' Time and Date
                                PRINT #5, Q$; RTRIM$(Recdrec.f4); Q$; ",";     ' Your answerback
                                PRINT #5, Q$; RTRIM$(Recdrec.f5); Q$; ",";     ' Submission time
                                PRINT #5, RTRIM$(Recdrec.f6); ",";             ' Line noise
                                PRINT #5, RTRIM$(Recdrec.f7); ",";             ' Signal strength
                                PRINT #5, RTRIM$(Recdrec.f8); ",";             ' Signal quality
                                PRINT #5, RTRIM$(Recdrec.f9); ",";             ' Rec'd error status
                                PRINT #5, Q$; RTRIM$(Recdrec.f10); Q$; ",";    ' PhoneNoIn$
                                PRINT #5, Q$; RTRIM$(Recdrec.f11); Q$; ",";    ' UserCmd$
                                PRINT #5, Q$; RTRIM$(Recdrec.f12); Q$; ",";    ' PIN$ line con't for rec'd measures ' Copy sent measures to FXCHK.RPT
                                MfgrNo$ = MID$(RecdNSF$, 7, 2)    ' Fax Manufacturer Number
```

```
                NSFPart$ = MID$(RecdNSF$, 10, 11) ' 4 NSF bytes (11 chars) may include model.
                                                 ' 4 is stab in dark
                ' Decode NSF Fax Manufacturer following NEC's doc rec'd from Chris King, Mita
                ' Is mfgr only valid within a country? Should we decode?
                SELECT CASE MfgrNo$
                        CASE "01"
                                Mfgr$ = "ANR" ' Anritsu
                        CASE "05"
                                Mfgr$ = "MSB" ' Mitsubishi
                        CASE "09"
                                Mfgr$ = "TOS" ' Toshiba
                        CASE "11"
                                Mfgr$ = "CAN" ' Canon
                        CASE "19"
                                Mfgr$ = "XER" ' Xerox
                        CASE "21"
                                Mfgr$ = "OKI" ' Oki
                        CASE "25"
                                Mfgr$ = "RIC" ' Ricoh
                        CASE "29"
                                Mfgr$ = "JRC" ' JRC?
                        CASE "31"
                                Mfgr$ = "SHA" ' Sharp
                        CASE "39"
                                Mfgr$ = "NAT" ' National
                        CASE "41"
                                Mfgr$ = "IWA" ' Iwatsu
                        CASE "45"
                                Mfgr$ = "MUR" ' Murata
                        CASE "49"
                                Mfgr$ = "NEC" ' NEC
                        CASE "51"
                                Mfgr$ = "SAN" ' Sanyo
                        CASE "59"
                                Mfgr$ = "FUJ" ' Fujitsu
                        CASE "61"
                                Mfgr$ = "CAS" ' Casio
                        CASE "66"
                                Mfgr$ = "MIT" ' Mita/CopyStar
                        CASE "69"
                                Mfgr$ = "HIT" ' Hitachi
                        CASE "71"
                                Mfgr$ = "TAM" ' Tamura Elec.
                        CASE "79"
                                Mfgr$ = "PAN" ' PanaFax
                        CASE ELSE
                                Mfgr$ = MfgrNo$ ' Unknown
                END SELECT PRINT #5, Q$; PhoneNumber$; Q$; ","; Retries%; ","; Q$; CompleteTime$; Q$; ",";
Q$; SubmitTime$; Q$; ","; Q$; RIGHT$(LSSEND$, 12); Q$; ","; ES%;
                                ' NSF len and content stored in FXCHK.RPT only, not in test report, to identify
fax maker and model
                                ' PRINT NSF length and content would make a record longer than 254
                                ' characters that Quattro Pro 3.0 can't import unless using the DELREAD macro
which is very slow.
                                ' So now we only decode length, mfgr, and 4 bytes, so its < 254.
                PRINT #5, ","; Q$; LenRecdNSF$; Q$; ","; Q$; Mfgr$; Q$; ","; Q$; NSFPart$; Q$ ' Mark copied record as available for next call
                Recdrec.free = true
                ' OutFaxLoad% = OutFaxLoad% - 1 ' moved down a few lines
                PUT #4, recno%, Recdrec TERM = false
            END IF
            recno% = recno% + 1
        LOOP
        OutFaxLoad% = OutFaxLoad% - 1
        GOSUB KillLSSEND
    ' ELSE
        ' Resubmit
        COLOR 4, 3: LOCATE 24, 9
        PRINT "Resubmitting fax to "; PhoneNumber$; " for time no.: "; Retries% + 1; "         ";
        COLOR 11, 1

' update "Number of times we called to deliver this report: "
        ' First find OUTDOC text file name:
        IF MID$(LSSEND$, 2, 16) = ":\FAX\WORK\FXCHK" THEN
                ' test report only, no list file
                OutReptFile$ = LSSEND$
                ResubmitCmd$ = "SEND " + LSSEND$
        ELSE
```

```
                                    ' list file
                                    OPEN "I", #6, LSSEND$
                                    IF PASS = false THEN
                                            tbuf3$ = ""
                                            OutReptFile$ = ""
                                            DO WHILE NOT EOF(6)
                                                    LINE INPUT #6, tbuf3$
                                                    IF MID$(tbuf3$, 2, 16) = ":\FAX\WORK\FXCHK" THEN
                                                            OutReptFile$ = tbuf3$
                                                            EXIT DO
                                                    END IF
                                            LOOP ' now tbuf3$ contains text file name
                                            CLOSE #6
                                            ResubmitCmd$ = "XLIST LIST " + LSSEND$
                                    ELSE
                                            ResubmitCmd$ = ""
                                    END IF
                            END IF Retries% = Retries% + 1

IF OutReptFile$ <> "" THEN ' if a test report, update retries
                                    ' make or clear 5K string buffer of blanks
                                    ' (If purpose is to clear, maybe unnecessary: string is var len,)
                                    ' (so even with shorter new file loaded, nothing remains of previous file)
                                    FXCHKxTXT$ = SPACE$(5000)
                                    OPEN OutReptFile$ FOR BINARY AS #6
                                    GET #6, 1, FXCHKxTXT$   ' read entire file into a var
                                    UserPosn% = INSTR(FXCHKxTXT$, "Previous times")
                                    Retries$ = RT$(STR$(Retries%), 2)
                                    PUT #6, UserPosn% + 68, Retries$   ' patch with # retries
                                    SentStat$ = RT$(STR$(ES%), 5)       ' bug in RSET? requires 5 chars
                                    PUT #6, UserPosn% + 141, SentStat$ ' patch with last sent error status
                                    CLOSE #6
                            END IF IF ResubmitCmd$ <> "" THEN
                                    OPEN "O", #3, "FXCHK5.CMD"
                                    ' Need MID$ below because a space is otherwise printed that stops GCL parser
                                    PRINT #3, "USER "; USID1$; ";"; MID$(STR$(Retries%), 2)
                                    ' XLIST ok for sending GCL, but what if a single file? 3103 error?
                                    PRINT #3, ResubmitCmd$
                                    PRINT #3, "RETRY 0"
                                    PRINT #3, "CALLS 1"
                                    PRINT #3, "CDTIME 60"   ' wait for fax modem answer tone for 60 sec.
                                    PRINT #3, "STARTTIME +00:"; SendInterval$; ":00"  ' place call few min. from now
                                    PRINT #3, "DIAL " + PhoneNumber$
                                    PRINT #3, "EXIT"
                                    CLOSE #3
                                    SHELL "LOADHI GCL FXCHK5.CMD > NUL"
                                    KILL "FXCHK5.CMD"
                            END IF ' but if ResubmitCmd$ = <> we have clean up yet to do
                    END IF
            END IF
    WEND
    CLOSE #5
    CLOSE #1
    ' Comment next line out to keep generating same report record
    KILL LFILE2$ ' = "FXCHK2.LOG" moved from end of KillLSSEND subr.
    RETURN
    END ' subroutine Reports '*******************************************************************
'*** KillLSSEND: Kill the files referenced by LSSEND$ then LSSEND$ *
'*******************************************************************
KillLSSEND:
    ' LSSEND is usually a *.$LS or .LST file needing its component files deleted.
    ' but when no fax page is sent, it is just FXCHK??.TXT.
    IF LSSEND$ <> "" THEN ' when logfile results from no more pending faxes to delete,
            ' then LSSEND$ is empty
            PASS = 0
            OPEN "I", #7, LSSEND$
            IF (PASS = false) THEN
                    ' GFDCP.EXE 4.3.1 names list files .$LS-- 4.4.0 calls them .LST
                    IF (RIGHT$(LSSEND$, 4) = ".$LS") OR (RIGHT$(LSSEND$, 4) = ".LST") THEN
                            WHILE NOT EOF(7)
                                    LINE INPUT #7, TBUF4$
                                    ' When FXCHK.RPB was sent, do not delete it
                                    IF RIGHT$(TBUF4$, 3) = "TIF" THEN
                                            TBUF4$ = RIGHT$(TBUF4$, 12)
                                            'Print the fax: Graceful exit, all pages, LaserJet 300x300, width scaling
                                            'Need GCL error-handler for printer unavailable
                                            IF (faxprint = true) THEN
                                                    FAXP$ = "LOADHI FAXP -G1 -P1 -M10 -X1 " + TBUF4$
                                                    SCREEN , , 1    ' can't suppress FAXP output with > NUL
                                                    ' shell "FAXM" could add header with CSID here
                                                    SHELL FAXP$
                                                    SCREEN , , 0    ' restore default screen
                                            END IF
                                            'deleting all pages of infax with KILL *00nP???.TIF
```

```
                            MID$(TBUF4$, 6) = "???"
                        END IF
                        ' make sure to mark permanent literature files as R/O or
                        ' the next line will delete them!  Use ATTRIB +R filespec
                        IF TBUF4$ <> "FXCHK.RPB" THEN KILL TBUF4$
                    WEND
                END IF
                CLOSE #7
                KILL LSSEND$
            END IF
        END IF
        ' KILL "FXCHK2.LOG" ' old position of this line, moved up
        RETURN
        END ' subroutine KillLSSEND '*********************************************************************
'* PaintScreen: Screen paint for unchangeable screen text       *
'*********************************************************************

PaintScreen:
        LOCATE 1, 1, 0  ' Invisible cursor
        SCREEN 0, 1
        COLOR 7, 0  ' white on black
        CLS ' black out screen
        COLOR 14, 3
        PRINT "              FaxChek(SM) Fax Diagnostic Online System V. "; ver$; "              "
        LOCATE 3, 1
        COLOR 9, 3
        PRINT " "; DATE$; "--started  Call counts, last 60 min., 24 hours    started--"; TIME$; " ";

' Print Fax Board headings
        LOCATE 4, 1
        COLOR 15, 1  ' Intense white on blue background
        boardheading% = ASC("A")
        PRINT " Board:";
        tabs% = 1
        FOR i% = 0 TO 7
                tabs% = tabs% + 8
                PRINT TAB(tabs%); CHR$(boardheading% + i%);
        NEXT i%
        PRINT "   Total    ";

COLOR 10, 1
        LOCATE 5, 1
        PRINT " Hour:                                                                   ";
        LOCATE 6, 1
        PRINT " Day:                                                                    ";
        COLOR 14, 3
        ' locate variables at column 27
        LOCATE 8, 1
        PRINT " Total logged calls:           Last rec'd time, date:              ";
        LOCATE 9, 1
        PRINT " Peak outbound faxes:          Last CSID:                          ";
        LOCATE 10, 1
        PRINT " Current outbound faxes:       Last DTMF phone no.:                ";
        LOCATE 11, 1
        PRINT " Received non-test faxes:      Last user command:                  ";
        LOCATE 12, 1
        PRINT "                               Last PIN:                           ";
        LOCATE 13, 1

PRINT " Last rec'd error status:      Last sent error status:             ";

COLOR 11, 1
        LOCATE 15, 1
        indent% = 10
        PRINT TAB(indent%); "Faxes received COPY to Drive A:                     "
        PRINT TAB(indent%); "Slow toggle                                   Now:  "
        PRINT TAB(indent%); "Print all incoming faxes toggle               Now:  "
        PRINT TAB(indent%); "Report FXCHK.RPT to printer                         "
        PRINT TAB(indent%); "Copy FXCHK.RPT to Drive A:                          "
        PRINT TAB(indent%); "DOS access.  Exit to return to FaxChek              "
        PRINT TAB(indent%); "Initialize and delete all Q records                 "
        PRINT TAB(indent%); "Exit to DOS                                         "
        COLOR 15, 1
        LOCATE 15, 1
        PRINT TAB(indent%); "F"
        PRINT TAB(indent%); "S"
        PRINT TAB(indent%); "P"
        PRINT TAB(indent%); "R"
        PRINT TAB(indent%); "C"
        PRINT TAB(indent%); "D"
        PRINT TAB(indent%); "I"
        PRINT TAB(indent%); "E"
        LOCATE 24, 1
        COLOR 14, 3
        PRINT "Status:                                                           ";
        COLOR 11, 1
        RETURN
        END ' subroutine PaintScreen
```

```
'*********************************************************************
'*** ErrorHander:    PASS=TRUE means file not found/access conflict***
'*********************************************************************
'                                                              ***
'*** ERR 53=File not found; ERR 57=Device I/O Error;           ***
'*** ERR 75=path/file access; ERR 64=bad file name             ***
'*** 57, 75 may occur if Q Mgr. is accessing files at same time ***
'*********************************************************************

ErrorHandler:
        IF test THEN IF ((ERR <> 53) AND (ERR <> 0)) THEN LPRINT "ERROR HANDLER: ERR NO.: "; ERR; ""
        IF test THEN IF ERR = 5 THEN STOP
        IF (ERR = 55) THEN
                LOCATE 25, 1
                PRINT "ERROR HANDLER: FILE ALREADY OPEN                                           "; : STOP
        END IF
        IF (ERR = 61) THEN
                LOCATE 25, 1
                PRINT "ERROR HANDLER: Disk Full, ERR NO.                                "; ERR; : STOP
        END IF
        IF (ERR = 53) THEN
                PASS = -1      ' true
        ELSE
                LOCATE 25, 1
                IF (ERR <> 75) THEN ' Access denied R/O attributes of .TIF literature files expected
                    PRINT "ERROR HANDLER: ERR NUMBER "; ERR; "        "; : SLEEP 2: STOP   ' ***take out stop
                END IF
                PASS = 0       ' false
        END IF
RESUME NEXT
END SUB CheckTime
    ' Timer Event Handler  update call counters every min. *
    STATIC timenow$, lastime$
    timenow$ = MID$(TIME$, 4, 2) ' extract minutes
    IF timenow$ <> lastime$ THEN
            lastime$ = timenow$
            CALL timehandler(0)
    END IF
END SUB FUNCTION LT$ (strng$, wid%)
        ' Returns left-justified strng$ in a string wid% long
        field$ = SPACE$(wid%)

LSET field$ = strng$
        LT$ = field$
END FUNCTION

SUB PRT (strng$, wid%)
        ' Prints strng$, right-justified in a field wid% wide at current position
        field$ = SPACE$(wid%)
        RSET field$ = strng$
        PRINT field$
END SUB SUB ReportRecord (UserCmd$)
        ' Adds record to FXCHK.RPT with rec'd measures only and UserCmd$ as "Cmd" in report
        OPEN "FXCHK.RPT" FOR APPEND AS #5

'       User        B(oard)      Rec'd time/date             Rec'd CSID
        PRINT #5, UserID%; ","; board%; ","; Q$; RTRIM$(Recdrec.f3); Q$; ","; Q$; RTRIM$(Recdrec.f4); Q$; ",";

'           Submit time/date            LN (line noise)       SS (signal strength)
        PRINT #5, Q$; RTRIM$(Recdrec.f5); Q$; ","; RTRIM$(Recdrec.f6); ","; RTRIM$(Recdrec.f7); ",";

'       Bit Errs           R Err (error status)       DTMF Phone                  pseudo-Cmd
        PRINT #5, RTRIM$(Recdrec.f8); ","; RTRIM$(Recdrec.f9); ","; Q$; RTRIM$(Recdrec.f10); Q$; ","; Q$; UserCmd$; Q$; ",";

'       PIN
        PRINT #5, Q$; RTRIM$(Recdrec.f12); Q$

CLOSE #5
END SUB

FUNCTION RT$ (strng$, wid%)
        ' Returns right-justified 'strng$' in a string 'wid%' long
        ' bug if len(strng$) = wid% ????
        field$ = SPACE$(wid%)
        RSET field$ = strng$
        RT$ = field$
END FUNCTION SUB timehandler (Dummy%)
    ' arrays:
    ' Inbound fax calls for each board for each of last 60 minutes,
    ' as printed on console screen.  Totals in callminutes%( j%, 60)
    ' main module updates a specific array element when a call comes in
    SHARED callminutes%()
```

```
' Inbound fax calls for each board for each of last 24 hours
' as printed on console screen.  Totals in callhours%(i%, 24)
SHARED callhours%()
SHARED minute%   ' the current minute 0 - 59
SHARED hour%     ' the current hour 0 - 23

COLOR 14, 3
' update date and time on top screen line
LOCATE 1, 2
PRINT DATE$
LOCATE 1, 72
PRINT LEFT$(TIME$, 8);

minute% = minute% + 1
IF minute% = 60 THEN minute% = 0

' Reset array for the current minute to 0 and begin accumulating calls
FOR i% = 0 TO 8
            callminutes%(i%, minute%) = 0
NEXT i% tabs% = 0
COLOR 10, 1
LOCATE 5, 8
FOR j% = 0 TO 7
            callminutes%(j%, 60) = 0
            FOR i% = 0 TO 59
              callminutes%(j%, 60) = callminutes%(j%, 60) + callminutes%(j%, i%)
            NEXT i%
            tabs% = tabs% + 8
            PRINT TAB(tabs%); callminutes%(j%, 60);
    NEXT j%
    callminutes%(8, 60) = 0
    FOR k% = 0 TO 7
                callminutes%(8, 60) = callminutes%(8, 60) + callminutes%(k%, 60)
                LOCATE 5, 71
                PRINT callminutes%(8, 60) ' Total incalls during last 60 minutes
    NEXT k%

LOCATE 6, 8
    IF minute% = 0 THEN

' Copy last hour's callminutes% totals to callhours%
            FOR i% = 0 TO 8
                        callhours%(i%, hour%) = callminutes%(i%, 60)
            NEXT i%

' start new hour
            hour% = hour% + 1
            IF hour% = 24 THEN hour% = 0

' total all call hours for day and print to screen
            tabs% = 0
            FOR j% = 0 TO 8
                        callhours%(j%, 24) = 0
                        FOR i% = 0 TO 23
                          callhours%(j%, 24) = callhours%(j%, 24) + callhours%(j%, i%)
                        NEXT i%
                        tabs% = tabs% + 8
                        PRINT TAB(tabs%); callhours%(j%, 24);
            NEXT j%

' print total calls for all boards for last 24 hours
            callhours%(8, 24) = 0
            FOR k% = 0 TO 7
                        callhours%(8, 24) = callhours%(8, 24) + callhours%(k%, 24)
                        LOCATE 6, 71
                        PRINT callhours%(8, 24) ' Total incalls during last 24 hours
            NEXT k%

END IF
    COLOR 11, 1
END SUB

'*******************************************************************
'*** GFAX.SDC script file to configure GammaFax CP/DFX boards    ***
'*******************************************************************

; debug 0xb700 0x7000 ; for normal debugging
; debug 0xC0C0 ; gives no t.30 info at all
; debug 0x0200 ; gives t.30 info: DIS/DCS, etc. to logfile not screen
chassis 1
buffers 0 ; was 2, but Ref. book, page 200 says unreliable
numchan 1
quantums 2 50 ; increase background time slice
;  quantums 2 40 ; see if more time gives better keystroke handling
;  board currently addr'd at 250Hex due to modem conflict
```

```
channel 1 3 GFAX1.1
country 1 1
init 1
boardtype 1 0x180          ; CP board with DFX daughterboard
; load 1 C:\FAX\GFXCP.BIN  ; for old daughterboard
load 1 C:\FAX\GFXCX.BIN    ; for new DFX daughterboard
CSID 1 +1 408 395 4594
; CSID is wrong, but people will reply to right (Sharp) machine
; gfxdebug 1 3
; gfxlog 1 3        ; use for debugging
gfxlog 1 0          ; normal setting
gfxform 1 3         ; input sanitization, images errors cleaned/MR not accepted
gfxtwod 1 0         ; MR files not accepted
gfxextend 1 2       ; full extended ASCII char set 0-255 for box drawing
gfxspeaker 1 3      ; enable speaker continuously
modemctrl 1 1024 1 ; tone dialing (undocumented, is not watchdog timer enable)
; next four lines for DFX daughterboard DTMF configuration, 4 lines:
gfxdtmftone 1 880 1000 ; prompt user with 880 Hz tone for 1000 msec.
gfxdigits 1 29 2048    ; allow 29 DTMF digits, terminated with hatch key
                       ; but should allow only 24, or a file contains TTs is created
gfxdtmftimeout 1 8 25  ; wait 8 sec for 1st DTMF tone, 25 for all tones
gfxecm 1 0 0           ; disable CCITT ECM mode, to see all line garbage gfxshutdown 1 0     ; Rcv/send gfxshutdown 1 1 will ignore future incoming calls
gfxwait 1 25        ; required when buffers=0, default is 60 pollt 0 275
controlt 15         ; was 10
queuet 30           ; was 10
updatet 300         ; was 10

;*********************************************************************
;*** FXCHK1.CMD GCL SCRIPT FILE                                    ***
;*********************************************************************

REM get last received record in the queue, since it corresponds to the
REM first entries in GFAX.$DL
$COUNTER 1 0
REM read through all the records and keep track of how many reads
DOWHILE GET RE == 0
     $COUNTER 1 +
ENDDO
REM current record is now the last
REM if no pass, there was no record to get
IF $COUNTER 1 > 0
   REPORT G FXCHK1.FMT
   LOG 3 FXCHK1.LOG
   SUMMARY
   DELETE
ENDIF
EXIT ;*********************************************************************
;* FXCHK3CMD GCL SCRIPT FILE                                     *
;*********************************************************************

GET SE
IF INQERROR == 0
   REPORT G FXCHK2.FMT
   LOG 1 FXCHK2.LOG
   SUMMARY
   DELETE S 1
ENDIF
EXIT

;*********************************************************************
;*** FXCHK4.CMD GCL SCRIPT FILE                                    ***
;*********************************************************************

REM report on and delete next pending Q rec for @PH, which is patched by code
REM do not edit top 8 lines or BINARY GET will not find @PH!
LOG 0
$counter 1 0
DOWHILE $counter 1 == 0
    GET PE
    IF INQERROR == 0
        IF @PH == "93954595999"
            REM  ^ offset 237 into this file, the place to patch
            REPORT G FXCHK2.FMT
            LOG 1 FXCHK2.LOG
            SUMMARY
            LOG 0
            REM DELETE current record, don't spec by number, which could change
            DELETE
            REM if record is busy during delete, then get it next pass
            IF INQERROR != 0
                DOS DEL FXCHK2.LOG
            ENDIF
            REM stop loop when any pending record for phone no. found
```

```
                REM if machine rebooted with a pending record from @PH,
                REM an undeletable PE garbage record is left. GCL takes
                REM about 10 sec to determine an error 1011/2, which is wrong
                REM So DELETE ALL ALL before exit or rebuild Q file to correct
                $counter 1 1
            ENDIF
        ELSE
            IF INQERROR == 1014
                $counter 1 1
                REM if reached end of pending Q list w/o finding a rec with
                REM phone no. in it, then put the STATUS 9999 in FXCHK2.LOG,
                REM as flag so main loop can stop looking for recs to delete
                LOG 1 FXCHK2.LOG
                SETERROR 9999
                LOG 0
            ENDIF
        ENDIF
ENDDO
EXIT !*********************************************************************
!* FXCHK1.FMT FORMAT FILE FOR TEST REPORT                        *
!*********************************************************************

User Id:              @US
Received Filename:    @RF
£fffffffffffffffffffffffffffffffffffffffffffffffffffffffffffffffffffff»
* YOUR TEST FAX TRANSMISSION                                         *
* Time and date we received your test fax:        @CT *
* Your answerback (CSID):                         @RI *
* Submission time:                                @SU *
* The number of fax pages you sent as your test fax:       @IR *
* Connect time in seconds:                                 @DU *
]ffffffffffffffffffffffffffffffffffffffffffffffffffffffffffffffffffff'
* TRANSMISSION SIGNAL MEASUREMENTS                                   *
* Your fax machine's transmission speed in bits/sec:       @MS *
* Telephone line noise in dBm:                             @LN *
* Signal Strength in dBm:                                  @SS *
* Signal to noise ratio in dBm:                              0 *
* Signal Quality:                                          @SQ *
* Error Status:                                            @SA *
]ffffffffffffffffffffffffffffffffffffffffffffffffffffffffffffffffffff'
* TEST REPORT DELIVERY ATTEMPTS                                      *
* Previous times we called to deliver this report:           0 *
* Last error status from previous delivery attempt:       None *
£fffffffffffffffffffffffffffffffffffffffffffffffffffffffffffffffffff¼
   FaxChek is a servicemark of FaxChek Systems. (c) 1991, FaxChek Systems !*********************************************************************
    !* FXCHK2.FMT FORMAT FILE FOR SENT MEASUREMENTS                  *
    !*********************************************************************

Error Status:       @SA
Send Filename:      @SF
Phone Number:       @PH
Completed Time:     @CT
Submission Time:    @SU
Length Received NSF:  @RL
Received NSF:       @RN
User Id:     @US
```

I claim:

1. A method for automatically testing a remote facsimile communications system, comprising the steps of:
   (a) transferring a test fax transmission from said remote facsimile communications system to a diagnostic system and automatically making quantitative measurements of said test fax transmission during the transferring process, thereafter
   (b) automatically preparing a test report in said diagnostic system incorporating said measurements, and thereafter
   (c) delivering said test report to a remote location, in order to inform a user at said remote location of the condition of said facsimile communications system.

2. The method of claim 1 wherein said facsimile communications system is connected to a public switched telephone network, further comprising the steps of:
   (a) receiving automatic number identification of said facsimile communications system's telephone number from said public switched telephone network,
   (b) transmitting said test report to said facsimile communications system's telephone number as designated by said automatic number identification.

3. The method of claim 1 wherein said facsimile communications system is connected to a public switched telephone network, further comprising the steps of:
   (a) receiving identification of said facsimile communications system's telephone number,
   (b) receiving transmitting subscriber identification of said facsimile communications system and
   (c) preparing said test report to include a message describing any discrepancy between the telephone number represented by said identification and the telephone number represented by transmitting subscriber identification.

4. The method of claim 1 wherein said test report includes a copy of said test fax transmission.

5. The method of claim 1 wherein said test fax transmission is received by means of a pay-per-call telephone number on a public switched telephone network.

6. The method of claim 1 wherein said test report is delivered by means of a spoken announcement.

7. The method of claim 1 wherein:
said facsimile communications system is connected to a telephone network,
said transferring step is by means of said telephone network and
said delivering step takes place during the same telephone connection as said transferring step.

8. The method of claim 1 wherein said steps of transferring and making quantitative measurements is by means of direct connection of said diagnostic system to a long distance telephone carrier's digital network, whereby said measurements may be used to avoid possible inaccuracies caused by a local loop connection.

9. The method of claim 1 wherein said test fax transmission includes transmitting a standard test chart of known content.

10. A diagnostic system for automatically testing a remote facsimile communications system, comprising:
(a) means for transferring a test fax transmission from said remote facsimile communications system to said diagnostic system,
(b) means coupled to said transferring means to automatically make quantitative measurements upon said test facsimile transmission, and
(c) reporting means for incorporating results of said measurements into a test report, and
(d) means coupled to said measuring means for delivering said test report to a remote location
in order to inform a user at said remote location of the condition of said facsimile communications system.

11. The system of claim 10, wherein:
said facsimile communications system is connected to a telephone network,
said test fax transmission includes receiving automatic number identification of said facsimile communications system's telephone number, and
said test report is delivered to said facsimile communications system as designated by said automatic number identification.

12. The system of claim 10 wherein:
said facsimile communications system is connected to a telephone network,
said test fax transmission includes receiving said facsimile communications system's telephone number, and
said test fax transmission includes receiving transmitting subscriber identification of said facsimile communications system,
said test report includes a message describing any discrepancy between said telephone number and said transmitting subscriber identification.

13. The system of claim 10 wherein said test report includes a copy of said test fax transmission.

14. The system of claim 10 wherein said test fax transmission is received by means of a pay-per-call telephone number on a public switched telephone network.

15. The system of claim 10 wherein said test report is delivered by means of a spoken announcement.

16. The system of claim 10 wherein:
said facsimile communications system is connected to a telephone network,
said transferring means is by means of said telephone network and
said delivering of said test report occurs during the same telephone connection as said transferring of the test fax transmission.

17. The system of claim 28 wherein said step of transferring is by means of direct connection of said diagnostic system to a long distance telephone carrier's digital network, whereby said measurements may be used to avoid possible inaccuracies caused by a local loop connection.

* * * * *